United States Patent
Yang

(10) Patent No.: US 11,461,226 B2
(45) Date of Patent: Oct. 4, 2022

(54) STORAGE DEVICE INCLUDING MEMORY CONTROLLER

(71) Applicant: SK hynix Inc., Icheon-si (KR)

(72) Inventor: Seung Won Yang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 169 days.

(21) Appl. No.: 16/918,962

(22) Filed: Jul. 1, 2020

(65) Prior Publication Data
US 2021/0191854 A1    Jun. 24, 2021

(30) Foreign Application Priority Data
Dec. 23, 2019 (KR) .................. 10-2019-0173295

(51) Int. Cl.
| | |
|---|---|
| *G06F 12/02* | (2006.01) |
| *G06F 12/0891* | (2016.01) |
| *G06F 12/0873* | (2016.01) |
| *G06F 11/30* | (2006.01) |
| *G06F 11/32* | (2006.01) |
| *G06F 13/16* | (2006.01) |
| *G06F 1/28* | (2006.01) |

(52) U.S. Cl.
CPC .......... *G06F 12/0246* (2013.01); *G06F 1/28* (2013.01); *G06F 11/3037* (2013.01); *G06F 11/3062* (2013.01); *G06F 11/327* (2013.01); *G06F 12/0873* (2013.01); *G06F 12/0891* (2013.01); *G06F 13/1673* (2013.01); *G06F 2212/7201* (2013.01)

(58) Field of Classification Search
None
See application file for complete search history.

(56) References Cited

U.S. PATENT DOCUMENTS

| | | | | |
|---|---|---|---|---|
| 5,900,022 | A * | 5/1999 | Kranich ............. | G06F 12/1054 711/E12.063 |
| 7,069,578 | B1 * | 6/2006 | Prus .................. | H04N 21/4383 725/132 |
| 7,610,433 | B2 * | 10/2009 | Randell ............. | G06F 12/1441 714/719 |
| 10,126,986 | B2 * | 11/2018 | Jung .................. | G06F 3/0656 |
| 10,713,095 | B2 * | 7/2020 | Yoo ................... | G06F 9/505 |
| 2002/0144081 | A1 * | 10/2002 | Willis ................ | G06F 12/1027 711/206 |

(Continued)

FOREIGN PATENT DOCUMENTS

| | | |
|---|---|---|
| KR | 10-2014-0034333 A | 3/2014 |
| KR | 10-1878200 B1 | 7/2018 |

*Primary Examiner* — Elias Mamo
(74) *Attorney, Agent, or Firm* — Perkins Coie LLP

(57) ABSTRACT

A memory controller having improved reliability and performance controls an operation of a memory device. The memory controller includes a first core configured to receive requests from a host, each request received with a corresponding first logical address associated with data requested from the host and having a first size, and to perform a logical address processing operation of converting the first logical address into a second logical address having a second size different from the first size; and a second core configured to convert the second logical address into a physical address to or from which the data is to be written or read, the physical address representing a position of a memory cell included in the memory device.

20 Claims, 13 Drawing Sheets

(56) References Cited

U.S. PATENT DOCUMENTS

2003/0110205 A1* 6/2003 Johnson ............. G06F 12/1036
718/1
2019/0138240 A1* 5/2019 Gayen ................. G06F 3/0655

* cited by examiner

FIG. 5

| LOGICAL ADDRESS BLOCK INFORMATION | flag1 |
|---|---|
| DUPLICATED REQUEST INFORMATION | flag2 |

PLP_Info

US 11,461,226 B2

STORAGE DEVICE INCLUDING MEMORY CONTROLLER

CROSS-REFERENCE TO RELATED APPLICATION

This patent document claims priority to and benefits of the Korean patent application number 10-2019-0173295, filed on Dec. 23, 2019, which is incorporated herein by reference in its entirety.

TECHNICAL FIELD

Exemplary embodiments of the disclosed technology generally relate to an electronic device, and more particularly, to a storage device including a memory controller.

BACKGROUND

Storage devices refer to electronic components that are used to store data on a permanent or temporary basis. Each storage device may include one or more storage mediums to store data and may further include a memory controller configured to control the memory device to store or retrieve data. The memory device is a memory device implemented using a semiconductor such as silicon (Si), germanium (Ge), gallium arsenide (GaAs), or indium phosphide (InP). The storage device can be classified based on the type of storage medium. For example, a hard disk drive (HDD) uses a magnetic disk as the storage medium, and a solid-state drive (SSD) or a memory card uses, as the storage medium, semiconductor memory devices such as a volatile memory device and a nonvolatile memory device.

A volatile memory device is a memory device that can retain its data only when the power is supplied. Thus, such a volatile memory device loses its data in the absence of power. Examples of the volatile memory device include a Static Random Access Memory (SRAM), a Dynamic RAM (DRAM), a Synchronous DRAM (SDRAM), and the like.

On the other hand, a nonvolatile memory device is a memory device that can retain its data even in the absence of power. Examples of the nonvolatile memory device include a Read Only Memory (ROM), a Programmable ROM (PROM), an Electrically Programmable ROM (EPROM), an Electrically Erasable and Programmable ROM (EEPROM), a flash memory, a Phase-change RAM (PRAM), a Magnetic RAM (MRAM), a Resistive RAM (RRAM), a Ferroelectric RAM (FRAM), and the like. The flash memory is generally classified into a NOR type flash memory and a NAND type flash memory.

To ensure a reliability of data stored in a storage device, a protection operation is performed in the storage device when there is an abnormal power supply to the storage device.

SUMMARY

Various embodiments of the disclosed technology provide a memory controller having improved performance and a storage device including the memory controller.

In one aspect, a memory controller for controlling an operation of a memory device is provided to comprise: a first core configured to receive, from a host, a write request and a first logical address which corresponds to the write request and has a first size, and perform a logical address processing operation of converting the first logical address into a second logical address having a second size different from the first size; and a second core configured to convert the second logical address into a physical address representing a position of a memory cell included in the memory device.

In another aspect, a memory controller for controlling an operation of a memory device is provided to comprise: a first core configured to receive requests from a host, each request received with a corresponding first logical address associated with data requested from the host and having a first size, and to perform a logical address processing operation of converting the first logical address into a second logical address having a second size different from the first size; and a second core configured to convert the second logical address into a physical address to or from which the data is to be written or read, the physical address representing a position of a memory cell included in the memory device.

In another aspect, a memory controller for controlling an operation of a memory device is provided to comprise: a first core configured to receive, from a host, a write request and a first logical address which corresponds to the write request and has a first size, and perform a logical address processing operation of converting the first logical address into a second logical address having a second size different from the first size; and a second core configured to perform a duplicated request check operation of processing, as an invalid request, a portion of duplicated write requests corresponding to the same logical address in the write request, and convert the second logical address into a physical address representing a position of a memory cell included in the memory device.

In another aspect, there is provided a memory controller for controlling an operation of a memory device, the memory controller including: a first core configured to receive, from a host, requests to read or write data from or to the memory device, each request received with a corresponding first logical address having a first size, and detect an abnormal power state having a power smaller than that of a normal power state and notify the abnormal power state to a second core, a first logical address being convertible to a second logical address having a second size different from the first size; a storage area configured to store meta data including a conversion relationship between a physical address and at least one of the first logical address and the second logical address, the physical address representing a position of a memory cell included in the memory device; and the second core configured to store the meta data in the memory device in response to the abnormal power state such that the meta data is stored prior to the data associated with the request.

In another aspect, a storage device including a memory device and a memory controller for controlling an operation of the memory device is provided. The storage device comprises: the memory controller including a first core and a second core, wherein the first core receives free logical address respectively corresponding to the two or more write requests, and the second core acquires a physical address corresponding to a memory cell included in the memory device by using a main logical address; a buffer memory configured to temporarily store data to be stored in the memory device; and the memory device configured to operate in response to a command received from the memory controller, wherein, in response to that the memory controller detects an abnormal power state, the first core cancels an operation being performed by the memory device, and performs a dump operation such that mapping information representing the physical address corresponding to the main logical address is stored in the memory device, and the first core determines whether the free logical addresses respectively corresponding to the two or more write requests are the same, while the second core is performing the dump operation.

In another aspect, there is provided a storage device including a memory device and a memory controller for controlling an operation of the memory device, the storage device including: the memory controller including a first core and a second core, the first core being configured to receive requests from a host with first logical addresses respectively corresponding to the requests and the second core being configured to obtain physical addresses corresponding to the first logical addresses, the physical addresses representing locations of areas in the memory device from or to which data associated with the requests are read or written; a buffer memory configured to store data to be stored in or read from the memory device; and the memory device configured to operate in response to a command received from the memory controller, wherein, in response to a detection of an abnormal power state, the second core is configured to cancel an operation being performed by the memory device and perform another operation to store mapping information used to obtain the physical address in the memory device, and the first core is configured to determine whether any two of the requests have been received from the host with a same first logical address while the mapping information is stored in the memory device.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. Like reference numerals refer to like elements throughout.

FIG. 5 is an example of a diagram illustrating an example of PLP information in accordance with an embodiment of the disclosed technology.

DETAILED DESCRIPTION

The specific examples of structural or functional features disclosed herein are merely illustrative for the purpose of describing embodiments or implementations of the disclosed technology. The disclosed technology can be implemented in various forms or configurations beyond the specific examples provided here.

Hereinafter, exemplary embodiments of the disclosed technology will be described in detail with reference to the accompanying drawings.

Figure 1:
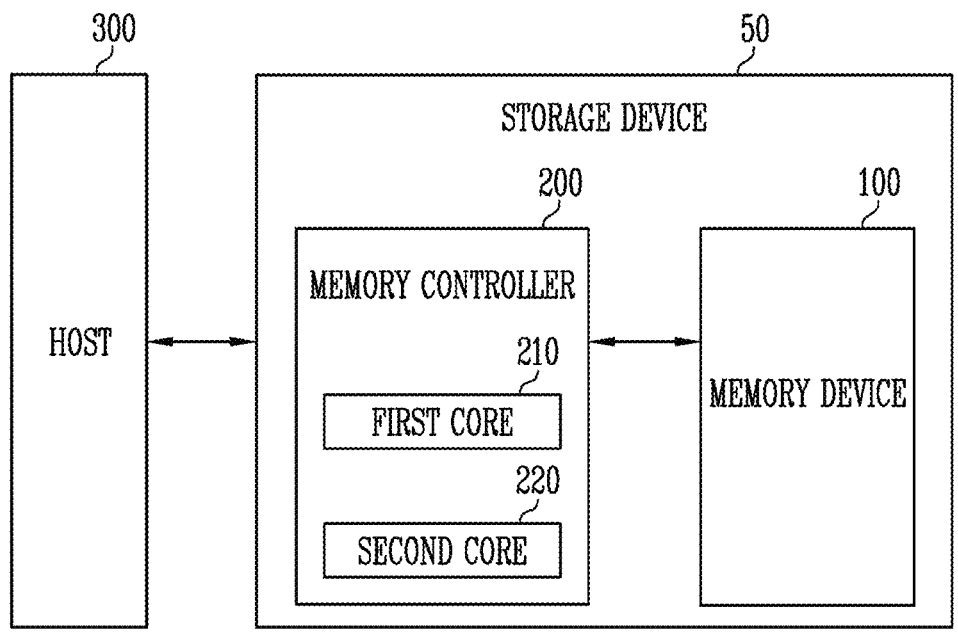
FIG. 1 is an example of a block diagram illustrating a storage device in accordance with an embodiment of the disclosed technology.

FIG. 1 is an example of a block diagram illustrating a storage device in accordance with an embodiment of the disclosed technology.

Referring to FIG. 1, the storage device 50 may include a memory device 100 and a memory controller 200 configured to control an operation of the memory device 100. The memory controller 200 may include a first core 210 and a second core 220.

The storage device 50 may be a device for storing data under the control of a host 300, such as a mobile phone, a smart phone, an MP3 player, a laptop computer, a desktop computer, a game console, a TV, a tablet PC or an in-vehicle infotainment.

The storage device 50 may be implemented as any one of various suitable types of storage devices which store data under the control according to a host interface as a communication scheme with the host 300. In some implementations, the host 300 can include a host device which includes a host interface. In some implementations, the storage device 50 may be implemented with any one of a variety of types of storage devices, such as a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), a memory stick, or others.

The storage device 50 may be or have any one of various kinds of package types. For example, the storage device 50 may be manufactured as any one of various kinds of package types such as a Package-On-Package (POP), a System-In-Package (SIP), a System-On-Chip (SOC), a Multi-Chip Package (MCP), a Chip-On-Board (COB), a Wafer-level Fabricated Package (WFP), or a Wafer-level Stack Package (WSP).

The memory device 100 may store data. The memory device 100 may operate under the control of the memory controller 200. The memory device 100 may include a memory cell array including a plurality of memory cells for storing data.

Each of the memory cells may configured as a Single Level Cell (SLC) storing one data bit, a Multi-Level Cell (MLC) storing two data bits, a Triple Level Cell (TLC) storing three data bits, or a Quadruple Level Cell (QLC) storing four data bits.

The memory cell array may include a plurality of memory blocks. Each of the memory blocks may include a plurality of memory cells. One memory block may include a plurality of pages. In an embodiment, the page may be a unit for storing data in the memory device 100 or reading data stored in the memory device 100.

In an embodiment, the memory device 100 may be a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, for convenience of description, a case where the memory device 100 is a NAND flash memory is assumed and described.

The memory device may receive a command and an address from the memory controller 200. The memory device 100 accesses an area selected by the received address in the memory cell array. That the selected area is accessed may mean that an operation corresponding to the received command is performed on the selected area. For example, the memory device 100 may perform a write (program) operation, a read operation, and an erase operation. In the program operation, the memory device may program data in the area selected by the address. In a read operation, the memory device 100 may read data from the area selected by the address. In the erase operation, the memory device 100 may erase data stored in the area selected by the address.

The memory controller 200 may control overall operations of the storage device 50.

When power is applied to the storage device 50, the memory controller 200 may execute firmware (FW). The FW may include a Host Interface Layer (HIL) which receives a request input from the host 300 or outputs a response to the host, a Flash Translation Layer (FTL) which manages an operation between an interface of the host 300 and an interface of the memory device 100, and a Flash Interface Layer (FIL) which provides a command to the memory device 100 or receives a response from the memory device 100.

In an embodiment, the memory controller 200 may receive data and a logical address (LA) from the host 300, and convert the LA into a physical address (PA) representing an address of memory cells in which data included in the memory device 100 is to be stored. The LA may be a logical block address (LBA), and the PA may be a physical block address (PBA).

The memory controller 200 may control the memory device 100 to perform a program operation, a read operation, an erase operation, or the like in response to a request from the host 300. In the program operation, the memory controller 200 may provide a program command, a PBA, and data to the memory device 100. In the read operation, the memory controller 200 may provide a read command and a PBA to the memory device 100. In the erase operation, the memory controller 200 may provide an erase command and a PBA to the memory device 100.

In an embodiment, the memory controller 200 may control the memory device 100 to autonomously perform a program operation, a read operation, or an erase operation, regardless of any request from the host 300. For example, the memory controller 200 may control the memory device 100 to perform a program operation, a read operation, an erase operation, or others, which is used to perform a background operation such as wear leveling, garbage collection, or read reclaim.

Referring to FIG. 1, the memory controller 200 may include the first core 210 and the second core 220. The first core 210 and the second core 220 may perform operations independently from each other. While performing operations independently from each other, the first core 210 and the second core 220 may exchange information on a progress state of an operation of the memory controller 200.

For example, the first core 210 may receive a request from the host 300 or perform an operation corresponding to the HIL which outputs a response to the host. In some implementations, the second core 220 may perform an operation corresponding to the FTL which manages an operation between the interface of the host 300 and the interface of the memory device 100. In some implementations, the second core 220 may further perform an operation corresponding to the FIL which provides a command to the memory device 100 or receive a response from the memory device 100.

The storage device 50 may be supplied with power from the outside. In some circumstances, for various reasons, a state of the power supplied to the storage device 50 may be abnormal. The abnormal state of the power may occur when the power supplied to the storage device 50 is interrupted. Alternatively, the abnormal state of the power may occur when power having a size smaller than that of normal power is supplied to the storage device 50. The abnormal state of the power may be defined as a Sudden Power Off (hereinafter, referred to as 'SPO'). The memory controller 200 may detect the SPO, and perform a Power Loss Protection (hereinafter, referred to as 'PLP') operation by using auxiliary power in the storage device 50. The PLP operation may be performed in the memory controller 200 and the memory device 100 when the SPO is detected. The PLP operation may include at least one of an operation of cancelling an operation being currently performed by the memory device 100 or a dump operation of storing data in the memory device 100. The dump operation may be performed to store data while auxiliary power is being supplied and until power is completely removed. The data to be stored in the memory device 100 may include data received from the host 300 associated with its command/request and/or meta data including mapping information between logical addresses and physical addresses. In some implementations, the meta data may be temporarily stored in a buffer memory included in the storage device 50 or the memory controller 200. The meta data may include mapping information representing a conversion relationship between an LA and a PA, which is required to store data in the memory device 100 or read data stored in the memory device 100, and hence high reliability for the metal data is required. Therefore, in some implementations, the meta data including the mapping information can be stored in the memory device 100 prior to the data associated with the write request received from the host 300.

When the SPO is detected, the first core 210 and the second core 220 may perform an operation for ensuring the reliability of data.

In various embodiments, the first core 210 may perform an operation on data associated with the write request received from the host 300, while the second core 220 may perform the dump operation to store the meta data in the memory device 100.

For example, an address system of data used by the host 300 may be different from that of data used by the second core 220. This is because a logical block size of data processed by the host 300 may be different from that of data processed by the second core 220. The first core 210 may perform a logical address conversion operation to convert an LA transferred from the host 300 into an LA having a size corresponding to that of an LA to be used by the second core 220. The LA transferred from the host 300 may be referred to as a pre-LA. In addition, the LA to be used by the second core 220 may be referred to as a main LA. Also, when there exists a request which has not yet been processed among requests received from the host 300 or when a request for the same LA is again received, the first core 210 may determine a previously received request as an unnecessary request. Also, the first core 210 may perform a duplicated request check operation of cancelling a resource for the previously received request. Detailed contents related to this will be described with reference to drawings which will be described later.

The host 300 may communicate with the storage device 50, using at least one of various communication manners, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a Universal Flash Storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

Figure 2:
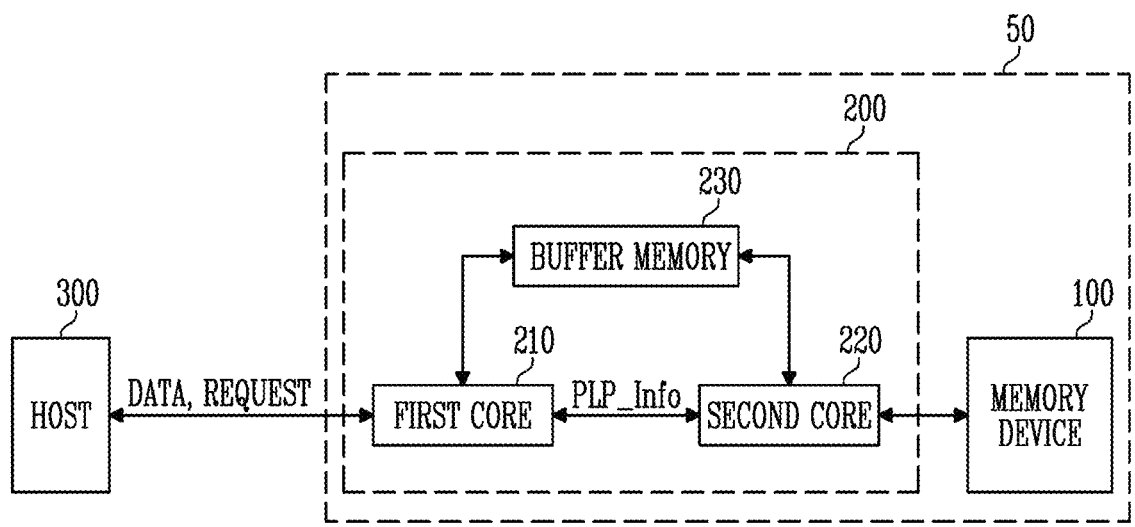
FIG. 2 is an example of a block diagram illustrating operations of a first core and a second core in accordance with an embodiment of the disclosed technology.

FIG. 2 is a block diagram illustrating operations of the first core and the second core in accordance with an embodiment of the disclosed technology.

Referring to FIG. 2, the host 300 may send a request and data associated with the request to the memory controller 200. The request received from the host 300 may include at least one of a write request or a read request. Hereinafter, a case where the request received from the host 300 is the write request is described as an example. In response to receiving the write request from the host 300, the memory controller 200 may control the memory device 100 such that the data received from the host 300 associated with the write request is stored in the memory device 100.

The memory controller 200 may include a first core 210, a second core 220, and a buffer memory 230. Referring to FIG. 2, a case where the buffer memory 230 is included in the memory controller 200 is illustrated. In various embodiments, the buffer memory 230 may be located inside of the storage device 50 and outside of the memory controller 200. The first core 210 and the second core 220 may access the buffer memory 230, and temporarily store data in the buffer memory 230 or process the temporarily stored data by using various methods.

In a situation in which SPO is not detected, the host 300 may provide a write request and data associated with the write request to the memory controller 200. The first core 210 may receive the write request and the data, and control the buffer memory 230 such that the data is temporarily stored in the buffer memory 230. In addition, the write request received from the host 300 may be added to a queue (not shown) of the first core 210. The queue (not shown) of the first core 210 may store requests received from the host 300 sequentially or according to a predetermined rule. A plurality of requests received from the host 300 are added to the queue (not shown), so that the response speed of the storage device 50 can be rapidly improved. When the first core 210 normally receives the write request and the data from the host 300, the first core 210 may provide request complete information to the second core 220. The second core 220 may receive the request complete information from the first core 210, and perform an operation for performing the write request from the host 300. For example, a command to be provided to the memory device 100 may be added to a queue (not shown) of the second core 220. The command to be provided to the memory device 100 may include a write command for performing the write request received from the host 300. In addition to the write request received from the host 300, the command to be provided to the memory device 100 may include a command for performing a background operation. The background operation may use less resources of the storage device 50 or the memory controller 200 than a general operation which is performed in response to a request entered from the host 300. For example, a logical address received from the host 300 may be converted into a physical address representing a storage position of the memory device 100. Mapping information used herein may be stored in a partial area of the buffer memory 230. The mapping information may be continuously updated while the background operation is being performed in addition to the write request received from the host 300. Since the updated mapping information is an important factor to affect the reliability of the storage device 50, the updated mapping information may be provided to the memory device 100 periodically or at a specific time. A command for storing the mapping information in the memory device 100 may also be included in the queue (not shown) of the second core 220. The second core 220 may provide a write command such that data temporarily stored in the buffer memory 230 is stored in the memory device 100. The memory device 100 may store data stored in the buffer memory 230 in a memory block (or page) corresponding to the PA of the memory device 100 in response to the command of the second core 220.

In a situation in which SPO is detected, the first core 210 may detect the SPO and notify the second core 220 of the SPO. Also, the first core 210 may check a write request and data, which are normally received from the host 300, and add the write request and the data to the queue (not shown) of the first core 210. In addition, meta data of the first core 210 may be further added to the queue (not shown) of the first core 210. The meta data of the first core 210 may be data about firmware used in an operation of the first core 210. Also, the first core 210 may provide the second core 220 with information included in the queue (not shown) of the first core 210. In some implementations, all the information included in the queue of the first core 210 can be provided to the second core 220.

In an embodiment, after the SPO is detected, the first core 210 may perform a logical address conversion operation and/or a duplicated request check operation. For example, the first core 210 may perform a logical address conversion operation of converting a logical address received from the host 300 into a logical address having a size corresponding to that of a logical address to be used by the second core 220. In some implementations, the first core 210 may perform a duplicated request check operation of determining whether any two requests from the host 300 have been made for the same logical addressv and cancelling a resource for a previous request if a current request from the host 300 has been received with a same logical address that was received for the previous request. For example, when the host 300 provides a write request for a specific logical address to the memory controller 200 after the host 300 provided a write request for the same logical address to the memory controller 200, the previous write request can be considered as unnecessary. Thus, the first core 210 may determine that the previous write request is unnecessary, and release the resource assigned for the previous write request. By releasing the resource, the previous write request is processed as an invalid request. In this case, the buffer memory 230 is controlled such that an area of the buffer memory 230, which was assigned for the previous write request to store associated data, becomes available for another data associated with another request. A sequence of the logical address conversion operation and the duplicated request check operation may be changed. Thus, the duplicated request check operation may be firstly performed, and the logical address conversion operation may be then performed.

In an embodiment, the first core 210 may notify the second core 220 that the SPO has been detected, and the second core 220 may perform a PLP operation in response to the detection of the SPO. In some implementations, during the PLP operation, the memory device 100 may cancel at least some of operations being currently performed. For example, it is assumed that the memory device 100 is currently performing an operation of storing data received from the host 300 associated with the write request and meta data including mapping information. The memory device 100 may cancel the current operations other than the operation of storing meta data including mapping information in the memory device. The operation of storing meta data including mapping information is referred to as a dump operation. The time required to perform the dump operation may be lengthened or shortened according to an amount of data. In an embodiment, the first core 210 may perform at least one of the logical address conversion operation and the duplicated request check operation while the second core 220 is performing the PLP operation. Since the operations performed by the first core 210 and the second core 220 are different from each other, the first core 210 and the second core 220 can operate at the same time, which increases a processing efficiency in case of an emergency situation.

The first core 210 may provide the second core 220 with PLP information 'PLP_Info' indicating statuses of the logical address conversion operation and the duplicated request check operation. The second core 220 may receive the PLP information 'PLP_Info,' and determine based on the received PLP information whether the first core 210 has completed the logical address conversion operation and the duplicated request check operation. When the PLP information 'PLP_Info' represents that the first core 210 has not completed at least one of the logical address conversion operation and the duplicated request check operation, the second core 220 may perform the corresponding operation which has not been completed. Subsequently, the second core 220 may convert a logical address into a physical address. Also, the second core 220 may provide a write command and data associated with the write command to the memory device such that the data stored in the buffer memory 230 is stored in a memory block (or page) corresponding to the physical address.

In another embodiment, the first core 210 may perform a logical address operation and a duplicated request check operation while the second core 220 is performing the PLP operation, and the first core 210 may convert a logical address into a physical address. When the first core 210 converts the logical address into the physical address, the first core 210 may notify the second core 220 that the logical address has been converted into the physical address.

Figure 3:
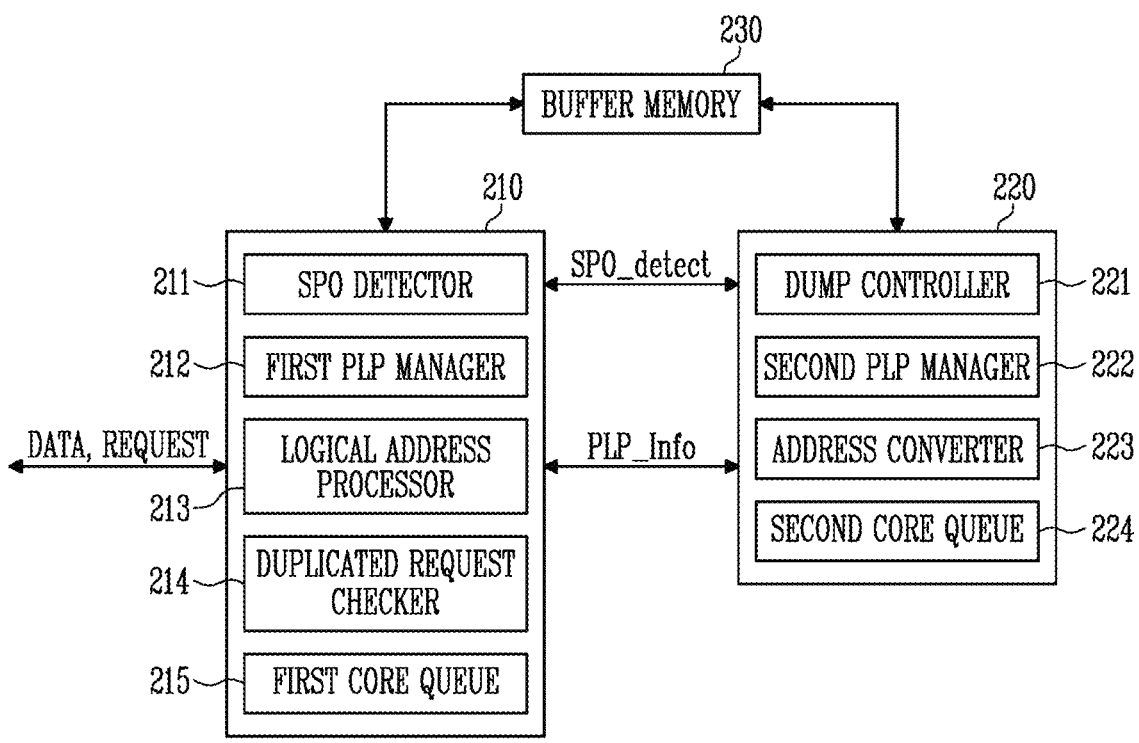
FIG. 3 is an example of a block diagram illustrating configurations of a first core and a second core in accordance with an embodiment of the disclosed technology.

FIG. 3 is a block diagram illustrating configurations of the first core and the second core in accordance with an embodiment of the disclosed technology.

Referring to FIG. 3, the first core 210 may include an SPO detector 211, a first PLP manager 212, a logical address processor 213, a duplicated request checker 214, and a first core queue 215.

The SPO detector 211 may detect SPO representing an abnormal power state. Also, the SPO detector 211 may provide the second core 220 with SPO information 'SPO_detect' representing the SPO has been detected through the first PLP manager 212.

The first PLP manager 212 may be coupled to the logical address processor 213 and the duplicated request checker 214. The first PLP manager 212 may control an operation of the logical address processor 213, and receive information representing whether a logical address conversion operation has been completed. The first PLP manager 212 may control an operation of the duplicated request checker 214, and receive information representing whether a duplicated request check operation has been completed. The first queue 215 includes requests received from the host 300 and the first PLP manager 212 may provide the second core 220 with the requests included in the first core queue 215. The first PLP manager 212 may provide the second core 220 with PLP information 'PLP_Info' representing results of the operations of the logical address processor 213 and the duplicated request checker 214.

The logical address processor 213 may perform a logical address conversion operation of converting a size of a logical address received from the host to correspond to that of a logical address used by the second core 220. Also, the logical address processor 213 may provide the first PLP manager 212 with information representing whether the logical address conversion operation has been completed.

The duplicated request checker 214 may perform a duplicated request check operation of determining whether any two requests from the host have been received with the same logical address, and releasing a resource for a previous request if a current request from the host has been received with the same logical address that was received for the previous request. Also, the duplicated request checker 214 may provide the first PLP manager 212 with information representing whether the duplicated request check operation has been completed.

The first core queue 215 may include requests received from the host. The requests received from the host may be added to the first core queue 215 sequentially or according to a predetermined rule. The requests added to the first core queue 215 may be performed sequentially or according to a predetermined rule. One or more requests received from the host are added to the first core queue 215, so that the response speed of the storage device 50 can be rapidly improved.

The second core 220 may include a dump controller 221, a second PLP manager 222, an address converter 223, and a second core queue 224.

The dump controller 221 may perform a dump operation of storing data in the memory device 100 while auxiliary power is being supplied. The data to be stored in the memory device 100 may include data associated with the write request received from the host or meta data including mapping information.

The second PLP manager 222 may receive SPO information 'SPO_detect' and PLP information 'PLP_Info' from the first PLP manager 212. The second PLP manager 222 may receive the SPO information 'SPO_detect,' and control an operation of the dump controller 221. The second PLP manager 222 may control an operation of the address converter 223. The second PLP manager 222 may add a request to the second core queue 224 or process a request as an invalid request. For example, the second PLP manager 222 processes a request currently performed by the memory device 100 in response to receiving the SPO information 'SPO_Info.'. In addition to the request received from the host, a request for storing meta data including mapping information in the memory device may be added to the second core queue 224. In addition, a request provided from the first core 215 may be added to the second core queue 224.

Figure 4:
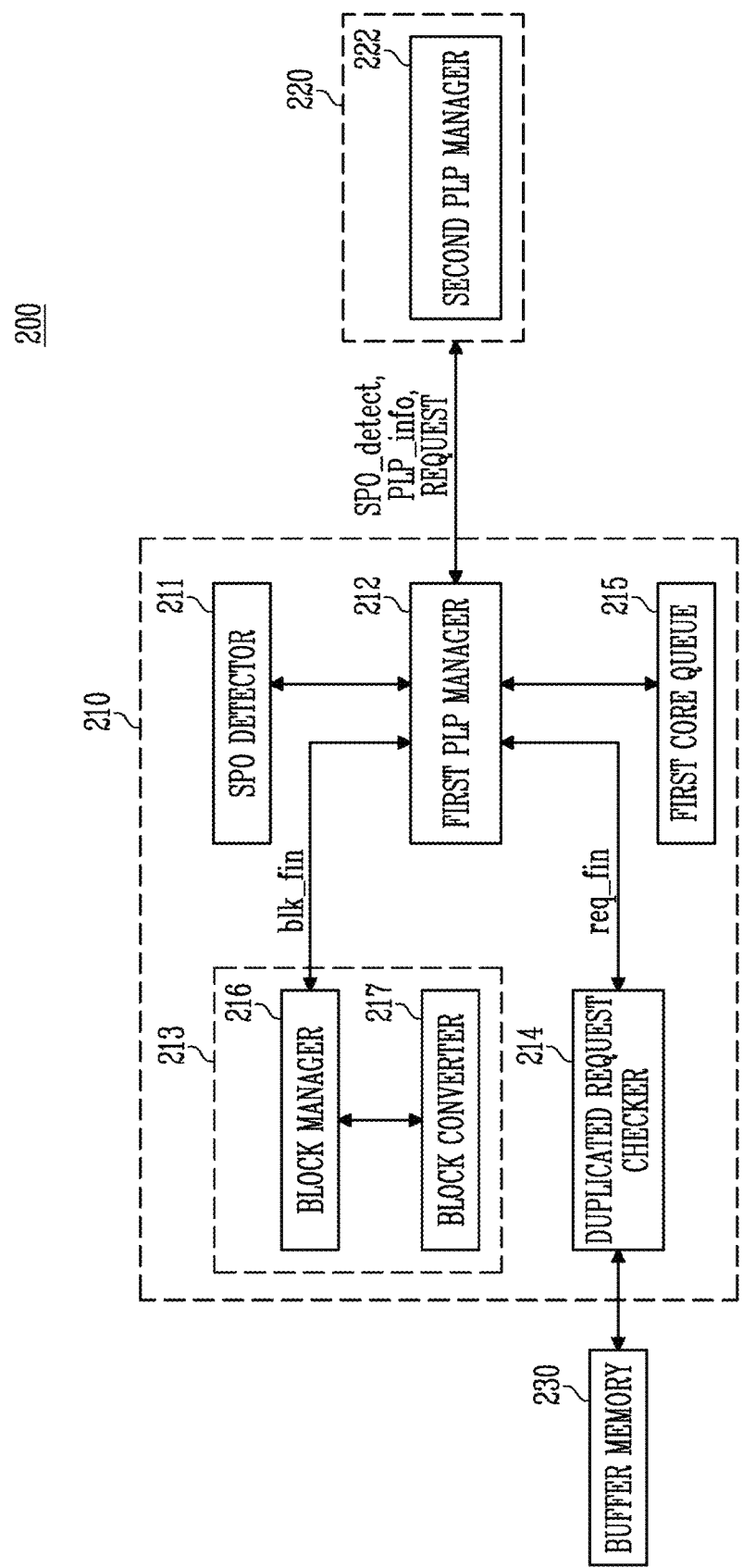
FIG. 4 is an example of a diagram illustrating an operation of a first core based on one embodiment of the disclosed technology.

FIG. 4 is a diagram illustrating an operation of the first core.

Referring to FIG. 4, the memory controller 200 may include a first core 210, a second core 220, and a buffer memory 230. The first core 210 may include an SPO detector 211, a first PLP manager 212, a logical address manager 213, a duplicated request checker 214, and a first core queue 215. The logical address processor 213 may include a block manager 216 and a block converter 217. The second core 220 may include a second PLP manager 222. A case where the buffer memory 230 is included in the memory controller 200 is illustrated. In various embodiments, the buffer memory 230 may be located inside of the storage device 50 and outside of the memory controller 200. The buffer memory 230 may be a volatile memory.

The SPO detector 211 may detect SPO representing an abnormal power state. Also, the SPO detector 211 may provide the second core 220 with SPO information 'SPO_detect' representing that the SPO has been detected through the first PLP manager 212.

The second PLP manager 222 may receive SPO information 'SPO_detect.' In addition, the second core 220 may perform a PLP operation in response to the SPO information 'SPO_detect.' The PLP operation may include a cancellation operation of cancelling an operation being performed by the memory device and a dump operation of storing meta data including mapping information in the memory device. While the second core 220 performs the PLP operation, a logical address conversion operation and a duplicated request check operation may be performed in the first core 210. In accordance with an embodiment, the first core 210 and the second core 220 may simultaneously perform independent operations. Therefore, when the SPO is detected, meta data and data associated with the write request received from the host may be stored in the memory device for a short time after the SPO is detected. In accordance with an embodiment, since the first core 210 and the second core 220 can simultaneously perform independent operation after the SPO is detected, the time is required to supply auxiliary power may be shortened. Thus, the reliability of data can be ensured using only an auxiliary power source for supplying a small amount of auxiliary power.

In some implementations, the first PLP manager 212 may control an operation of the logical address processor 213. The block manager 216 may determine whether a size of a logical address transferred from the host is equal to that of a logical address to be used by the second core 220. Based on the determination, the block manager 216 controls whether the logical address processor 213 performs the logical address conversion operation. For example, a logical address corresponding to a request provided from the host may have a size of 512 bytes and a logical address processed by the second core 220 may have a size of 1 kilobyte. As described in the example, when the logical addresses have different sizes, the block manager 216 may perform a logical address conversion operation to convert the logical address transferred from the host to a corresponding logical address processed by the second core 220. In another example, the size of the logical address transferred from the host may be equal to that of the logical address processed by the second core 220. In this case, the logical address conversion operation may not be performed. The logical address processor 213 may provide the first PLP manager 212 with logical address block information 'blk_fin' including at least one of information representing whether the logical address conversion operation has been completed and information representing the size of the logical address.

The first PLP manager 212 may control an operation of the duplicated request checker 214. The duplicated request checker 214 may determine whether the requests have been received with the same logical address. When it is determined that the requests have been received with the same logical address, the duplicated request checker 214 may perform a duplicated request check operation of releasing a resource assigned for the previously received request. The duplicated request check operation of releasing the resource will be described in more detail by using a write request as an example. When two or more write requests with the same logical address are input from the host, it may be determined that a previous write request is unnecessary. Therefore, the previous write request may be processed as an invalid request. In addition, the buffer memory 230 may be controlled such that an area in which data corresponding to the previous write request has been temporarily stored can be used to store another data. When it is determined that any two requests from the host have been not received with the same logical address, the duplicated request check operation of releasing the resource may not be performed. The duplicated request checker 214 may provide the first PLP manager 212 with duplicated request information 'req_fin' representing whether the duplicated request check operation has been completed.

The first PLP manager 212 may provide the SPO information 'SPO_detect' to the second core 220. The first PLP manager 212 may provide the second core 220 with a request included in the first core queue 215. The first PLP manager 212 may provide PLP information 'PLP_info' to the second PLP manager 222. The PLP information PLP_info may include logical address block information 'blk_fin' including at least one of information representing whether the logical address conversion operation has completed and information representing a size of a logical address. Also, the PLP information 'PLP_info' may include duplicated request information 'req_fin' representing whether the duplicated request check operation has been completed.

The second PLP manager 222 may receive PLP information 'PLP_info' including logical address block information 'blk_fin.' When the logical address block information 'blk_fin' included in the PLP information 'PLP_info' represents that the logical address conversion operation has been completed, the second core 220 may not perform the logical address conversion operation. Thus, the second core 220 may determine that the first core 210 has already performed the logical address conversion operation, and skip the logical address conversion operation. Meanwhile, when the logical address block information 'blk_fin' included in the PLP information 'PLP_info' represents that the logical address conversion operation has not been completed, the second core 220 may perform the logical address conversion operation. Thus, the second core 220 may determine that the first core 210 has not performed the logical address conversion operation, and perform the logical address conversion operation. As described above, the second core 220 may first determine whether a size of a logical address transferred from the host is equal to that of a logical address to be used by the second core 220. In addition, the second core 220 may perform a logical address conversion operation of performing conversion to convert the logical address transferred from the host to a corresponding logical address processed by the second core 220. When it is determined that the first core 210 has not performed the logical address conversion operation or has not completely performed the logical address conversion operation, the second core 220 may perform the above-described logical address conversion operation of the logical address processor 213.

The second PLP manager 222 may receive PLP information 'PLP_info' including duplicated request information 'req_fin.' When the duplicated request information 'req_fin' included in the PLP information 'PLP_info' represents that the duplicated request check operation has been completed, the second core 220 may not perform the duplicated request check operation. Thus, the second core 220 may determine that the first core 210 has already performed the duplicated request check operation, and skip the duplicated request check operation. Meanwhile, when the duplicated request information req_fin included in the PLP information 'PLP_info' represents that the duplicated request check operation has not been completed, the second core 220 may perform the duplicated request check operation. Thus, the second core 220 may determine that the first core 210 has not performed the duplicated request check operation, and perform the duplicated request check operation. As described above, the second core 220 may first determine whether any two or more requests from the host have been received with the same logical address have been received from the host. When it is determined that any two or more requests with the same logical address have been input from the host, the second core 220 may perform a duplicated request check operation of releasing a resource assigned for a previous request. As discussed for a case that the duplicated request checker 214 of the first core 210, the second core 220 may process the previous write request as an invalid request. Also, the second core 220 may control the buffer memory 230 such that an area in which data corresponding to the previous write request processed as the invalid request is temporarily stored is used to store another data. When it is determined that the first core 210 has not performed the duplicated request check operation or has not completely perform the duplicated request check operation, the second core 220 may perform the above-described duplicated request check operation of the duplicated request checker 214.

Thus, the second core 220 may selectively perform at least one of the logical address conversion operation or the duplicated request check operation based on the determination that the first core 210 has not performed or has not completely performed the logical address conversion operation and/or the duplicated request check operation.

FIG. 5 is a diagram illustrating an example of PLP information PLP_info in accordance with an embodiment of the disclosed technology.

The PLP information 'PLP_info' may include at least one of logical address block information 'blk_fin' and duplicated request information 'req_fin.'

The logical address block information 'blk_fin' may include at least one of information representing whether the logical address conversion operation has been completed and information representing a size of a logical address. As shown in FIG. 5, a first flag 'flag1' may represent whether the logical address conversion operation has been completed. For example, when the first flag 'flag1' represents '0000,' this represent that the logical address conversion operation has been completed. The second core may receive the logical address block information 'blk_fin' included in the PLP information 'PLP_info,' and determine whether to perform the logical address conversion operation. When the logical address block information 'blk_fin' represents that the first core has not perform the logical address conversion operation or has not completely performed the logical address conversion operation, the second core may perform the logical address conversion operation. Even when the logical address block information 'blk_fin' represents that the first core has not perform the logical address conversion operation or has not completely performed the logical address conversion operation, if a size of a logical address transferred from the host is equal to that of a logical address to be used by the second core, the second core may not perform the logical address conversion operation. Meanwhile, when the logical address block information 'blk_fin' represents that the first core has performed the logical address conversion operation has performed, the second core does not perform the logical address conversion operation but may skip the logical address conversion operation.

The duplicated request information 'req_fin' may include information representing whether the duplicated request check operation has been completed. As shown in FIG. 5, a second flag 'flag2' may represent whether the duplicated request check operation has been completed. For example, when the second flag 'flag2' represents '1000,' this may represent that the duplicated request check operation has been completed. The second core may receive the duplicated request information 'req_fin' included in the PLP information 'PLP_info,' and determine whether to perform the duplicated request check operation. When the duplicated request information 'req_fin' represents that the first core has not performed the duplicated request check operation or has not completely performed the duplicated request check operation, the second core may perform the duplicated request check operation.

Figure 6:
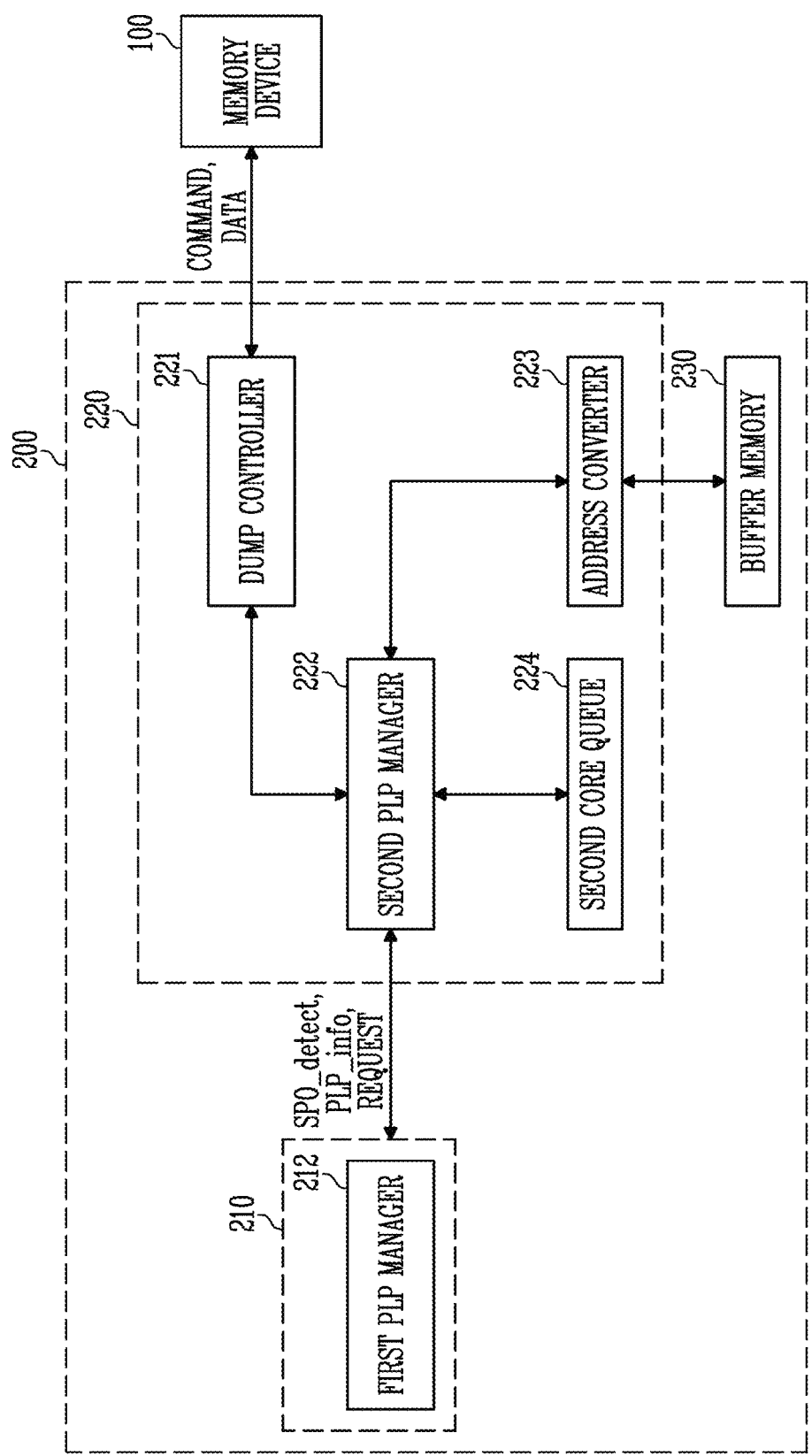
FIG. 6 is an example of a diagram illustrating in detail an operation of the second core.

FIG. 6 is a diagram illustrating in detail an operation of the second core.

Referring to FIG. 6, the memory controller 200 may include a first core 210, a second core 220, and a buffer memory 230. The second core 220 may include a dump controller 221, a second PLP manager 222, an address converter 223, and a second core queue 224.

In some implementations, the second PLP manager 222 may receive SPO information 'SPO_detect' from the first core 210. The second PLP manager 222 may perform an operation of cancelling an operation being performed by the memory device 100 in response to receiving the SPO information 'SPO_detect.' Subsequently, the second PLP manager 222 may control the dump controller 221 to perform a dump operation. The dump operation may include storing data in the memory device 100 while auxiliary power is being supplied and before power is completely interrupted. The data to be stored in the memory device 100 may include meta data that is temporarily stored in the buffer memory 230. The meta data may include mapping information representing a conversion relationship between a logical address and a physical address. The high reliability for the mapping information is required since the mapping information is used to store data in the memory device 100 or read data stored in the memory device 100. Therefore, after SPO is sensed or detected, while the operations being performed by the memory device 100 may be cancelled, the meta data including the mapping information may be stored in the memory device 100. The priority to store the meta data in the memory device 100 is higher than that to store the data associated with the write request from the host. The data associated with the write request corresponds to data that has been requested by the host to store in the memory device. While the second PLP manager 222 and the dump controller 221 cancel an operation being performed by the memory device 100 such that the meta data is stored in the memory device 100, the first core 210 may perform at least one of the logical address conversion operation and the duplicated request check operation, which are described in FIG. 4. Thus, the first core 210 and the second core 220 are configured to perform different operations at the same time. In some implementations, the first core 210 may provide PLP information 'PLP_info' to the second core 220. The second PLP manager 222 may perform other operations which are not performed by the first core 210. For example, when the PLP information 'PLP_info' represents that the logical address conversion operation has not been performed or has not been completely performed, the second PLP manager 222 may perform the logical address conversion operation. In another example, when the PLP information 'PLP_info' represents that the duplicated request check operation has not been performed or has not been completely performed, the second PLP manager 222 may perform the duplicated request check operation.

When the PLP information 'PLP_info' represents that both the logical address conversion operation and the duplicated request check operation have been performed, the second PLP manager 222 may control the address converter 223 to convert a logical address into a physical address. The address converter 223 may acquire a physical address corresponding to a logical address by using the mapping information temporarily stored in the buffer memory 230. Also, the second PLP manager 222 may receive a request from the first core 210, and add the received request to the second core queue 224.

The dump controller 221 may perform a dump operation of storing data in the memory device 100 while auxiliary power is being supplied. The meta data including the mapping information may be already stored in the memory device 100. In this case, a dump operation of storing data corresponding to a request included in the second core queue 224 may be performed. Since the logical address conversion operation and the duplicated request check operation have been completed, the dump operation may be rapidly performed. Specifically, the second PLP manager 222 and the dump controller 221 may perform an operation corresponding to the request included in the second core queue 224. A case where a write request is included in the second core queue 224 is assumed. The dump controller 221 may generate a write command corresponding to the write request. Also, the dump controller 221 may provide the memory device 100 with the write command and the data associated with the write request and temporarily stored in the buffer memory 230. In addition, the physical address converted by the address converter 223 may be provided to the memory device 100. The memory device 100 may receive the write command, the data associated with the write request, and the physical address. The memory device 100 may store the data in a memory cell included in a memory block (or page) corresponding to the physical address.

Figure 7:
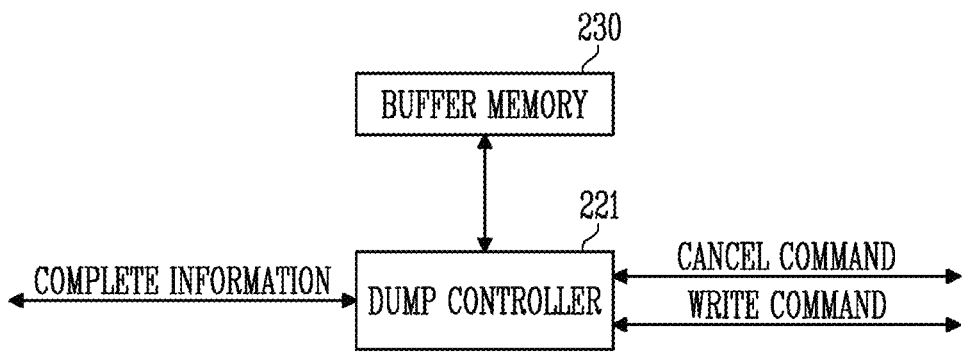
FIG. 7 is an example of a diagram illustrating an operation of a dump controller.

FIG. 7 is a diagram illustrating an operation of the dump controller.

Referring to FIG. 7, when the dump controller 221 receives a notification of SPO, the dump controller 221 may generate a cancel command such that the memory device cancels an operation being performed, and provide the generated cancel command to the memory device. The memory device receives the cancel command and suspend the operation being currently performed. The dump controller 221 may generate a write command such that meta data is stored in the memory device prior to storing of the data associated with the write request, and provide the generated write command to the memory device. The memory device may receive the write command and the meta data, and store the meta data. When the memory device cancels the operation being performed and stores the meta data, the first core 210 shown in FIG. 6 may perform the logical address conversion operation or the duplicated request check operation. After the meta data is stored, the dump controller 221 may generate a completion information 'meta_fin' representing that storing of the meta data has been completed. The completion information 'meta_fin' may be provided to the first core 210 shown in FIG. 6. The first core 210 may receive the completion information 'meta_fin,' and generate PLP information 'PLP_info.' The first core 210 may receive the complete information 'meta_fin,' and generate information representing whether the logical address conversion operation or the duplicated request check operation has been completed.

Figure 8:
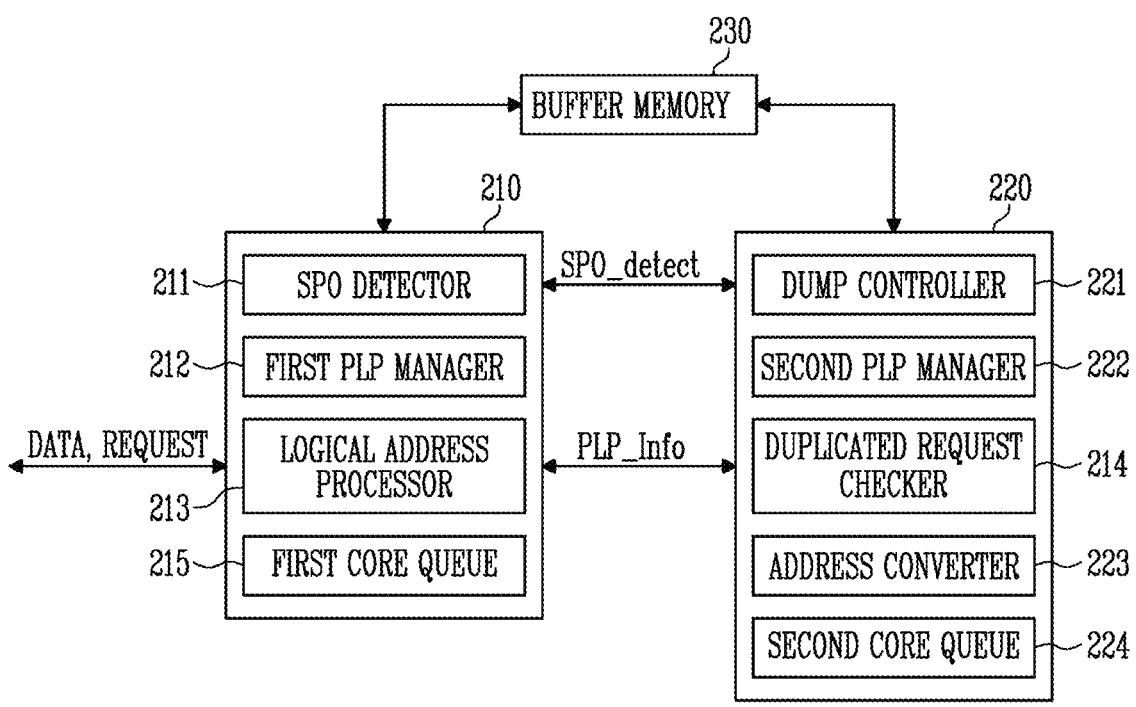
FIG. 8 is an example of a block diagram illustrating a configuration of the first core and the second core in accordance with an embodiment of the disclosed technology.

FIG. 8 is a block diagram illustrating a configuration of the first core and the second core in accordance with an embodiment of the disclosed technology.

In FIG. 8, contents identical or corresponding to those described in FIG. 3 are omitted, and portions different from those described in FIG. 3 will be mainly described.

Referring to FIG. 8, the first core 210 may include an SPO detector 211, a first PLP manager 212, a logical address processor 213, and a first core queue 215. The second core 220 may include a dump controller 221, a second PLP manager 222, a duplicated request checker 214, an address converter 223, and a second core queue 224. A portion different from that described in FIG. 3 is that the duplicated request checker 214 included in the first core 210 is included in the second core 220 in the embodiment shown in FIG. 8.

The logical address processor 213 included in the first core 210 may perform a logical address conversion operation of converting a logical address transferred from the host into a logical address having a size corresponding to that a logical address to be used by the second core 220. The second core 220 may notify the first core 210 that a dump operation of storing meta data in the memory device has been completed. The first core 210 may be in a state in which the logical address conversion operation is being performed, and a duplicated request check operation has not yet been performed. The first core 210 may provide the second core 220 with PLP information 'PLP_info' representing the logical address conversion operation is being performed, and the duplicated request check operation has not been performed. The second core 220 may receive the PLP information 'PLP_info,' and check that the duplicated request check operation has not been performed. In addition, the duplicated request checker 214 included in the second core 220 may perform the duplicated request check operation. Thus, the second core 220 may perform the duplicated request check operation while the first core 210 performs the logical address conversion operation. In accordance with an embodiment, operations are simultaneously performed by the first core 210 and the second core 220, and thus data can be safely stored in the memory device within a short time after SPO occurs.

Referring to FIG. 8, there is illustrated a case where the first core 210 performs the logical address conversion operation and the second core 220 performs the duplicated request check operation, but the logical address conversion operation and the duplicated request check operation may be performed regardless of their sequence. Therefore, the first core 210 may include the duplicated request checker 214, and preferentially perform the duplicated request check operation. Accordingly, the second core 220 may include the logical address processor 213, and perform the logical address conversion operation.

Figure 9:
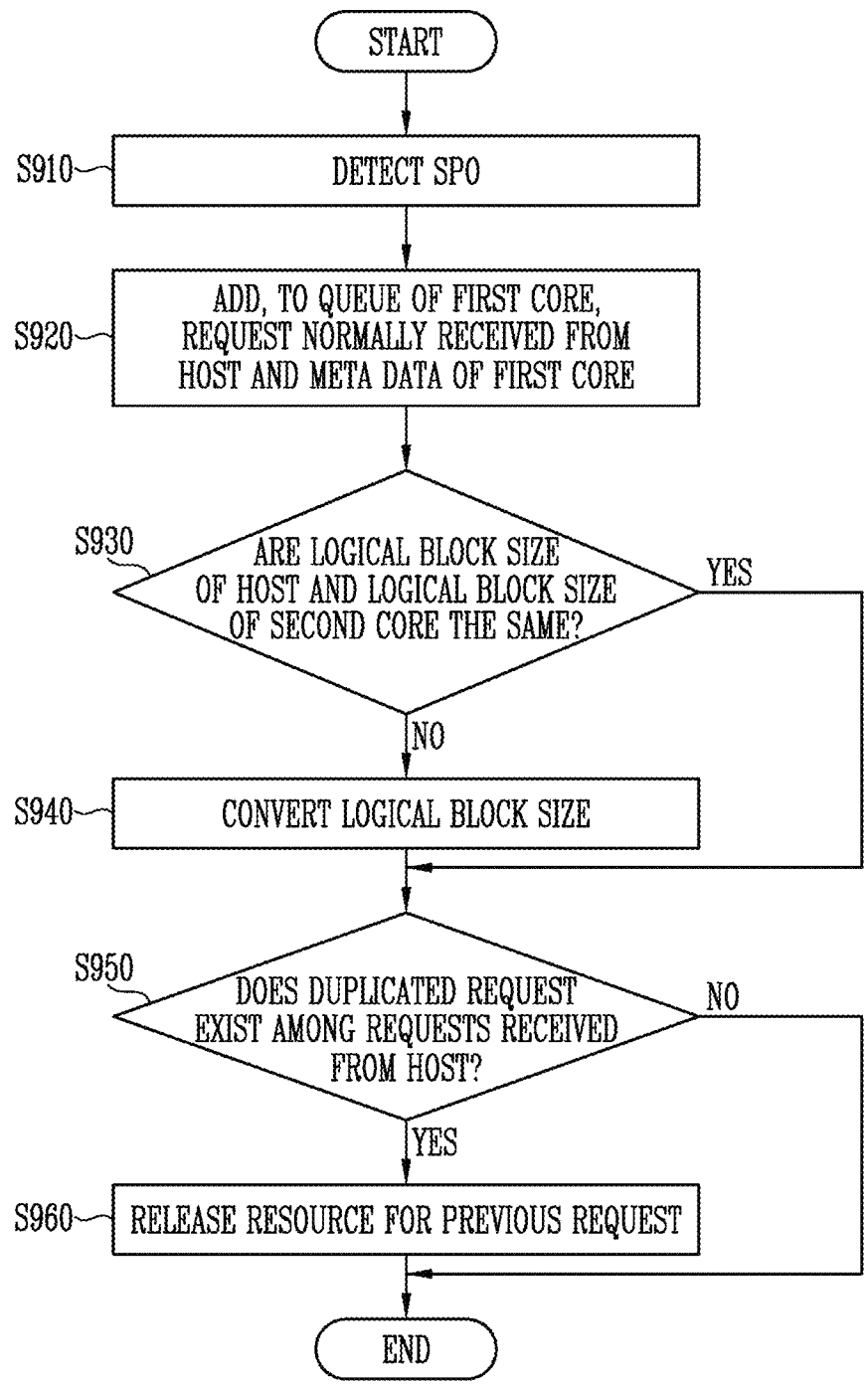
FIG. 9 is an example of a flowchart illustrating a case where the first core performs a logical address processing operation and a duplicated request check operation.

FIG. 9 is a flowchart illustrating a case where the first core performs a logical address conversion operation and a duplicated request check operation.

In step S910, the first core may detect SPO. The first core may notify the second core that the SPO has been detected.

In step S920, the first core may check a request normally received from the host, and add the normally received request to a queue of the first core. The normally received request may be a request received before the SPO is detected. Also, the first core may add meta data of the first core to the queue of the first core. The meta data of the first core may include data about firmware used for an operation of the first core.

In step S930, the first core may determine whether a logical block size of the host and a logical block size of the second core are the same. That is, the first core may determine whether an address system of data used by the host and an address system of data used by the second core are the same. When the logical block sizes are not the same, the first core may proceed to step S940. When the logical block sizes are the same, the first core may proceed to step S950.

In the step S940, the first core may convert a logic block size. That is, the first core may perform a logical address conversion operation of converting a logical address transferred from the host into a logical address having a size corresponding to that of a logical address to be used by the second core.

In the step S950, the first core may determine whether requests from the host have been received with the same logical address. The first core may determine whether two or more requests with the same logical address have been received from the host. When the duplicated request exists, the first core may proceed to step S960. When the duplicated request does not exist, the duplicated request check operation may not be performed.

In the step S960, when two or more requests with the same logical address have been received from the host, the first core may release a resource assigned for a previous request. In this case, the previous request is considered as unnecessary and processed as an invalid request. Also, the buffer memory is controlled such that the area in which data corresponding to the previous request processed as the invalid request is temporarily stored is used to store another data.

As described above, the steps S930 and S940 may correspond to the logical address conversion operation. In addition, the steps S950 and S960 may correspond to the duplicated request check operation. A sequence of the logical address conversion operation and the duplicated request check operation may be changed. Therefore, the steps S950 and S960 may be performed earlier than the steps S930 and 940.

Figure 10:
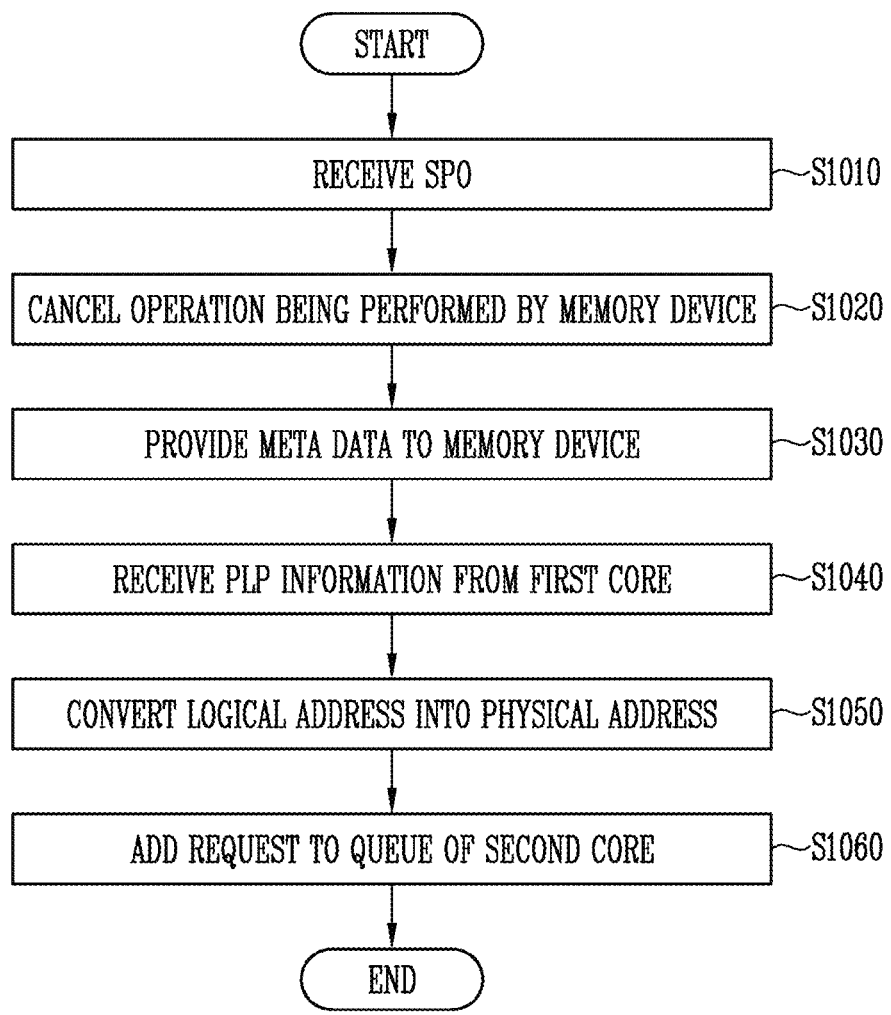
FIG. 10 is an example of a flowchart illustrating an operation of the second core.

FIG. 10 is a flowchart illustrating an operation of the second core.

In step S1010, the second core may receive, from the first core, SPO information representing that SPO has been detected.

In step S1020, the second core may cancel an operation being currently performed by the memory device.

In step S1030, the second core may provide meta data to the memory device such that the meta data is stored in the memory device. The meta data includes data essential to the operation of the memory device and the reliability of the meta data needs to be secured. For example, the meta data may include mapping information. Since the mapping information is essential to the operation of the memory device, the mapping information is stored in the memory device prior to other data including data associated with the request from the host. Therefore, in the step S1030, the meta data including the mapping information may be provided to the memory device.

In step S1040, the second core may receive PLP information 'PLP_info' from the first core. The PLP information 'PLP_info' may include information on whether the first core has performed a logical address conversion operation or a duplicated request check operation. A case where the received PLP information 'PLP_info' represents that the first core has performed both the logical address conversion operation and the duplicated request check operation is assumed.

In step S1050, the second core may convert a logical address received from the host into a corresponding physical address. The physical address may represent a position of a memory cell included in the memory device.

In step S1060, the second core may add a request received from the first core to a queue of the second core. The second core may control the memory device in response to the added request. For example, when the added request is a write request, the second core may provide the memory device with a write command, data to be stored, and a physical address. The memory device may store data in a memory cell corresponding to the physical address.

Figure 11:
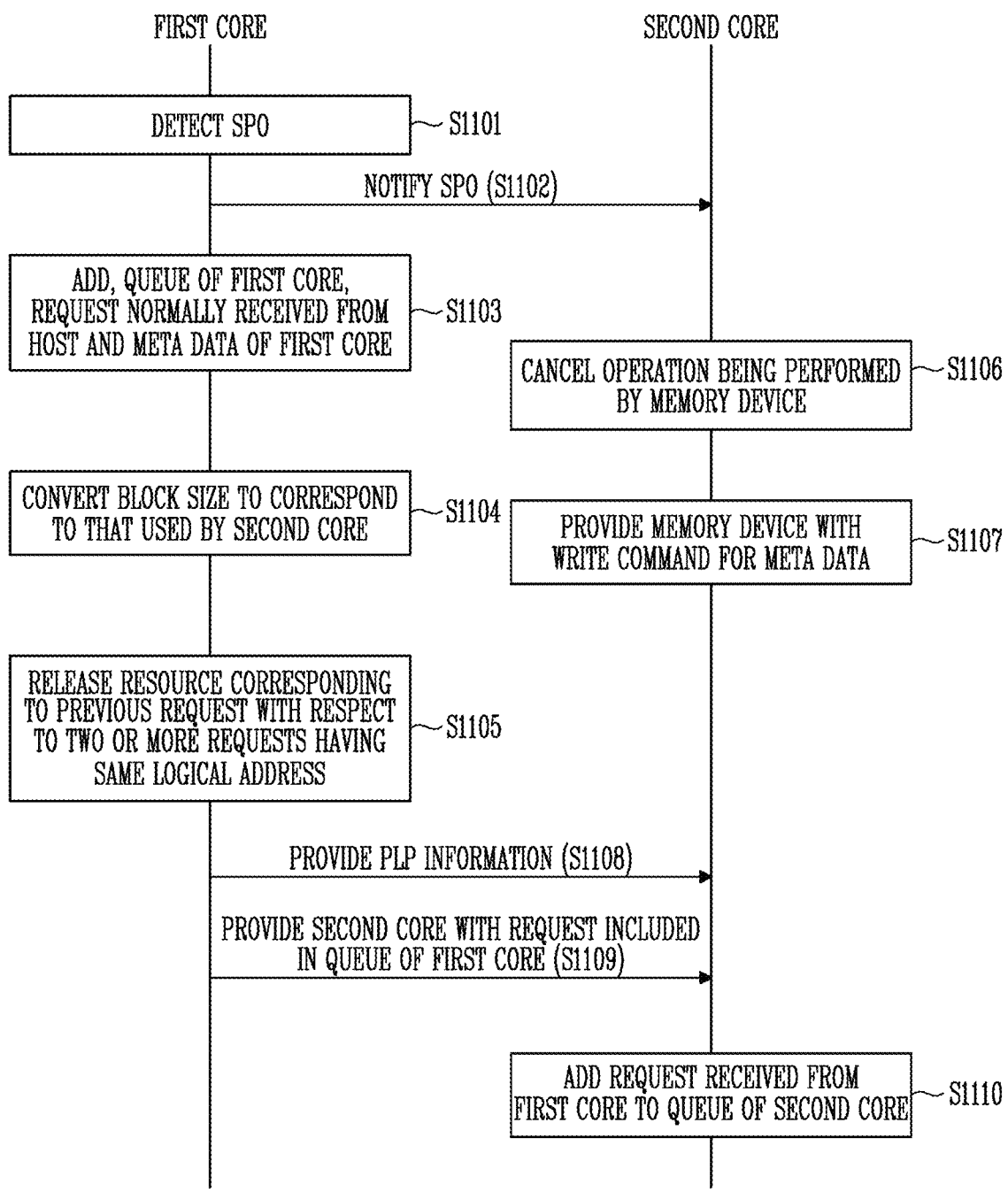
FIG. 11 is an example of a flowchart illustrating operations of the first core and the second core.

FIG. 11 is a flowchart illustrating operations of the first core and the second core.

In step S1101, the first core may detect SPO.

In step S1102, the first core may notify the second core that the SPO has been detected. In some implementations, the first core may provide the second core with information representing that the SPO has been detected.

In step S1103, the first core may add, to a queue of the first core, a request received from the host and metal data. The meta data may include data about firmware of the first core.

In step S1104, the first core may convert a block size received from the host to correspond to that used by the second core. The first core may convert a logical address size such that a size of a logical address used by the host and a size of a logical address used by the second core are the same. In some other embodiments, the step S1104 may be performed by the second core.

In step S1105, the first core may check whether two or more requests with the same logical address have been received from the host, and release a resource assigned to a previous request if there are two or more requests with the same logical address. The first core may process the previous request as an invalid request, and control the buffer memory such that the area in which data corresponding to the previous request is temporarily stored is used to store another data. In some other embodiments, the step S1105 may be performed by the second core.

In step S1106, the second core may cancel an operation being performed by the memory device.

In step S1107, the second core may provide a write command to the memory device to store meta data including mapping information.

In step S1108, the first core may provide PLP information 'PLP_info' to the second core. The PLP information 'PLP_info' may include information on whether the steps S1104 and S1105 have been performed.

In step S1109, the first core may provide the second core with a request included in the queue of the first core.

In step S1110, the second core may receive the request from the first core, and add the received request to a queue of the second core.

Figure 12:
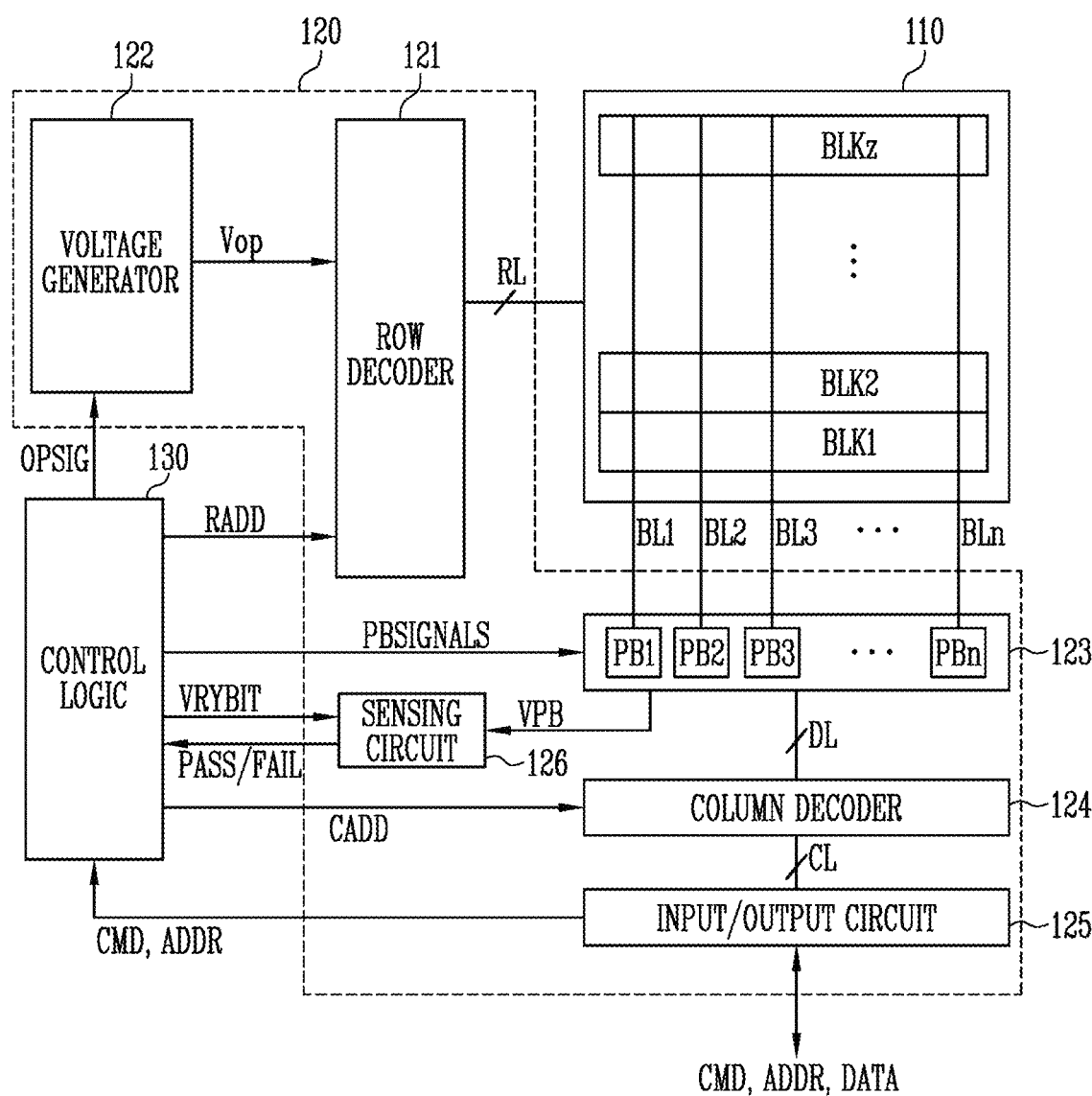
FIG. 12 is an example of a diagram illustrating a memory device in accordance with an embodiment of the disclosed technology.

FIG. 12 is a diagram illustrating a memory device 100 in accordance with an embodiment of the disclosed technology.

Referring to FIG. 12, the memory device 100 may include a memory cell array 100, a peripheral circuit 120, and a control logic 130.

The memory cell array 110 includes a plurality of memory blocks BLK1 to BLKz. The plurality of memory blocks BLK1 to BLKz are coupled to a row decoder 121 through row lines RL. The plurality of memory blocks BLK1 to BLKz are coupled to a page buffer group 123 through bit lines BL1 to BLn. Each of the plurality of memory blocks BLK1 to BLKz includes a plurality of memory cells. In an embodiment, the plurality of memory cells may be nonvolatile memory cells. Memory cells coupled to the same word line may be defined as one page. That is, the memory cell array 110 is configured with a plurality of physical pages. Therefore, one memory block may include a plurality of pages.

Each of the memory cells included in the memory cell array 110 may be configured as a Single Level Cell (SLC) storing one data bit, a Multi-Level Cell (MLC) storing two data bits, a Triple Level Cell (TLC) storing three data bits, or a Quadruple Level Cell (QLC) storing four data bits.

The peripheral circuit 120 may perform a program operation, a read operation or an erase operation on a selected region of the memory cell array 110 under the control of the control logic 130. The peripheral circuit 120 may drive the memory cell array 110. For example, the peripheral circuit 120 may apply various operating voltages to the row lines RL and the bit lines BL1 to BLn or discharge the applied voltages under the control of the control logic 130.

The peripheral circuit 120 may include the row decoder 121, the voltage generator 122, the page buffer group 123, a column decoder 124, an input/output circuit 125, and a sensing circuit 126.

The peripheral circuit 120 drives the memory cell array 110. For example, the peripheral circuit 120 may drive the memory cell array 110 to perform a program operation, a read operation, and an erase operation.

The row decoder 121 is coupled to the memory cell array 110 through the row lines RL. The row lines RL may include at least one source select line, a plurality of word lines, and at least one drain select line. In an embodiment, the word lines may include normal word lines and dummy word lines. In an embodiment, the row lines RL may further include a pipe select line.

The row decoder 121 operates under the control of the control logic 130. The row decoder 121 receives a row address RADD from the control logic 130.

The row decoder 121 decodes the row address RADD. The row decoder 121 selects at least one memory block among the memory blocks BLK1 to BLKz according to the decoded address. Also, the row decoder 121 may select at least one word line of the selected memory block to apply voltages generated by the voltage generator 122 to the at least one word line WL according the decoded address.

For example, in a program operation, the row decoder 121 may apply a program voltage to the selected word line, and apply a program pass voltage having a level lower than that of the program voltage to unselected word lines. In a program verify operation, the row decoder 121 may apply a verify voltage to the selected word line, and apply a verify pass voltage having a level higher than that of the verify voltage to the unselected word lines. In a read operation, the row decoder 121 may apply a read voltage to the selected word line, and apply a read pass voltage having a level higher than that of the read voltage to the unselected word lines.

In an embodiment, an erase operation of the memory device 100 is performed in a unit of a memory block. In the erase operation, the row decoder 121 may select one memory block according to the decoded address. In the erase operation, the row decoder 121 may apply a ground voltage to word lines coupled to the selected memory blocks.

The voltage generator 122 operates under the control of the control logic 130. The voltage generator 122 generates a plurality of voltages by using an external power voltage supplied to the memory device 100. Specifically, the voltage generator may generate various operating voltages Vop used in program, read, and erase operations in response to an operation signal OPSIG. For example, the voltage generator 122 may generate a program voltage, a verify voltage, a pass voltage, a read voltage, an erased voltage, and the like under the control of the control logic 130.

In an embodiment, the voltage generator 122 may generate an internal power voltage by regulating the external power voltage. The internal power voltage generated by the voltage generator 122 is used as an operation voltage of the memory device 100.

In an embodiment, the voltage generator 122 may generate a plurality of voltages by using the external power voltage or the internal power voltage.

For example, the voltage generator 122 may include a plurality of pumping capacitors for receiving the internal power voltage, and generate the plurality of voltages by selectively activating the plurality of pumping capacitors under the control of the control logic 130.

The plurality of generated voltages may be supplied to the memory cell array 110 by the row decoder 121.

The page buffer group 123 includes first to nth page buffers PB1 to PBn. The first to nth page buffers PB1 to PBn are coupled to the memory cell array 110 respectively through first to nth bit lines BL1 to BLn. The first to nth bit lines BL1 to BLn operate under the control of the control logic 130. Specifically, the first to nth bit lines BL1 to BLn may operate in response to page buffer control signals PBSIGNALS. For example, the first to nth page buffers PB1 to PBn may temporarily store data received through the first to nth bit lines BL1 to BLn, or sense voltages or current of the bit lines BL1 to BLn in a read or verify operation.

Specifically, in a program operation, the first to nth page buffers PB1 to PBn may transfer data DATA received through the input/output circuit 125 to selected memory cells through the first to nth bit lines BL1 to BLn, when a program pulse is applied to a selected word line. Memory cells of a selected page are programmed according to the transferred data DATA. A memory cell coupled to a bit line to which a program allow voltage (e.g., a ground voltage) is applied may have an increased threshold voltage. A threshold voltage of a memory cell coupled to a bit line to which a program inhibit voltage (e.g., a power voltage) is applied may be maintained. In a program verify operation, the first to nth page buffers PB1 to PBn read page data from the selected memory cells through the first to nth bit lines BL1 to BLn.

In a read operation, the first to nth page buffers PB1 to PBn read data DATA from the memory cells of the selected page through the first to nth bit lines BL1 to BLn, and outputs the read data DATA to the input/output circuit 125 under the control of the column decoder 124.

In an erase operation, the first to nth page buffers PB1 to PBn may float the first to nth bit lines BL1 to BLn.

The column decoder 124 may communicate data between the input/output circuit 125 and the page buffer group 123 in response to a column address CADD. For example the column decoder 124 may communicate data with the first to nth page buffers PB1 to PBn through data lines DL, or communicate data with the input/output circuit 125 through column lines CL.

The input/output circuit 125 may transfer a command CMD and an address ADDR, which are received from the memory controller 200 described with reference to FIG. 1, to the control logic 130, or exchange data DATA with the column decoder 124.

In a read operation or verify operation, a sensing circuit 126 may generate a reference current in response to an allow bit VRYBIT signal, and output a pass or fail signal PASS/FAIL by comparing a sensing voltage VPB received from the page buffer group 123 and a reference voltage generated by the reference current.

The control logic 130 may control the peripheral circuit 120 by outputting the operation signal OPSIG, the row address RADD, the page buffer control signals PBSIGNALS, and the allow bit VRYBIT in response to the command CMD and the address ADDR. Also, the control logic 130 may determine whether the verify operation has passed or failed in response to the pass or fail signal PASS/FAIL.

Figure 13:
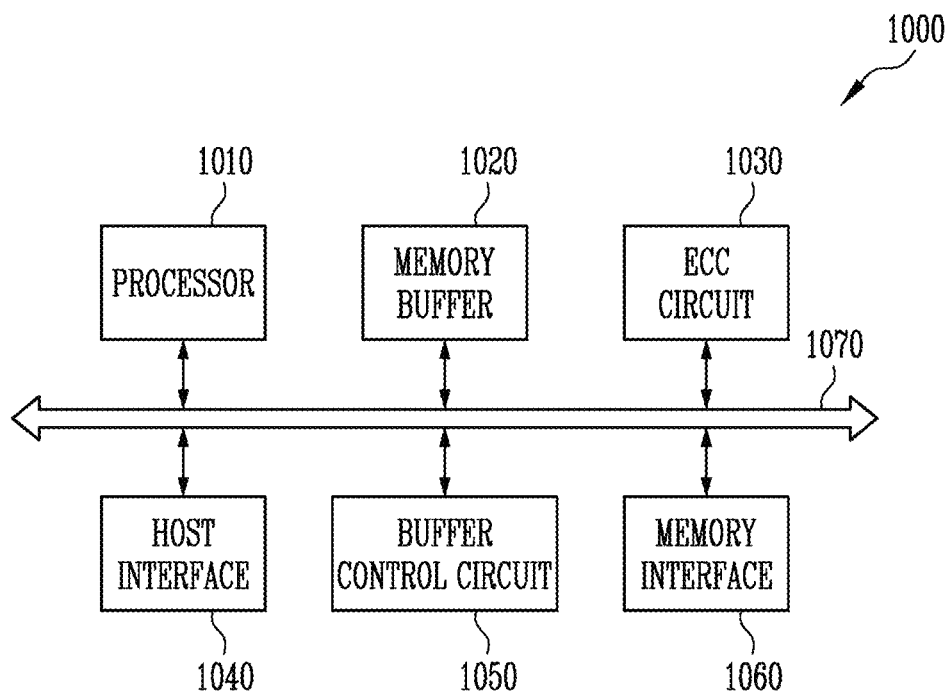
FIG. 13 is an example of a diagram illustrating another embodiment of a memory controller shown in FIG. 1.

FIG. 13 is a diagram illustrating another embodiment of the memory controller shown in FIG. 1.

Referring to FIG. 13, a memory controller 1000 is coupled to a host and a memory device. The memory controller 1000 may access the memory device in response to a request received from the host.

The memory controller 1000 may include a processor 1010, a memory buffer 1020, an error correction code (ECC) circuit 1030, a host interface 1040, a buffer control circuit 1050, a memory interface 1060, and a bus 1070.

The bus 1070 may be configured to provide channels between components of the memory controller 1000.

The processor 1010 may control overall operations of the memory controller 1000, and perform a logical operation. The processor 1010 may communicate with the external host through the host interface 1040, and communicate with the memory device through the memory interface 1060. Also, the processor 1010 may communicate with the memory buffer 1020 through the buffer control circuit 1050. The processor 1010 may control an operation of the storage device, using the memory buffer 1020 as a working memory, a cache memory or a buffer memory.

The processor 1010 may perform a function of a Flash Translation Layer (FTL). The processor 1010 may randomize data received from the host. For example, the processor 1010 may randomize data received from the host, using a randomizing seed. The randomized data is provided as data to be stored to the memory device to be programmed in the memory cell array.

In a read operation, the processor 1010 may derandomize data received from the memory device. For example, the processor 1010 may derandomize data received from the memory device, using a derandomizing seed. The derandomized data may be output to the host.

In an embodiment, the processor 1010 may perform randomizing and derandomizing by driving software or firmware.

The memory buffer 1020 may be used as the working memory, the cache memory, or the buffer memory of the processor 1010. The memory buffer 1020 may store codes and commands, which are executed by the processor 1010. The memory buffer 1020 may include a Static RAM (SRAM) or a Dynamic RAM (DRAM).

The ECC circuit 1030 may perform an ECC operation. The ECC circuit 1030 may perform ECC encoding on data to be written in the memory device through the memory interface 1060. The ECC encoded data may be transferred to the memory device through the memory interface 1060. The ECC circuit 1030 may perform ECC decoding on data received from the memory device through the memory interface 1060. In an example, the ECC circuit 1030 may be included as a component of the memory interface 1060 in the memory interface 1060.

The host interface 1040 may communicate with the external host under the control of the processor 1010. The host interface 1040 may communicate with the host, using at least one of various communication manners, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a NonVolatile Memory Express (NVMe), a Universal Flash Storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

The buffer control circuit 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

In an example, the memory controller 1000 may not include the memory buffer 1020 and the buffer control circuit 1050.

In an example, the processor 1010 may control an operation of the memory controller 1000 by using codes. The processor 1010 may load codes from a nonvolatile memory device (e.g., a read only memory (ROM)) provided in the memory controller 1000. In another example, the processor 1010 may load codes from the memory device through the memory interface 1060.

In an example, the bus 1070 of the memory controller 1000 may be divided into a control bus and a data bus. The data bus may be configured to transmit data in the memory controller 1000, and the control bus may be configured to transmit control information such as a command and an address in the memory controller 1000. The data bus and the control bus are separated from each other, and may not interfere or influence with each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

Figure 14:
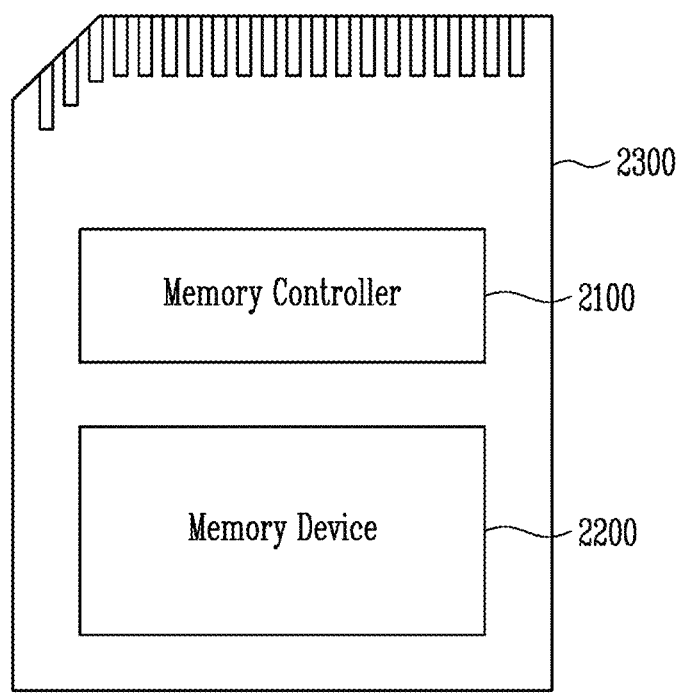
FIG. 14 is an example of a block diagram illustrating a memory card system to which the storage device including the memory device is applied in accordance with an embodiment of the disclosed technology.

FIG. 14 is a block diagram illustrating a memory card system to which the storage device including the memory device is applied in accordance with an embodiment of the disclosed technology.

Referring to FIG. 14, the memory card system 2000 includes a memory controller 2100, a memory device 2200, and a connector 2300.

The memory controller 2100 is coupled to the memory device 2200. The memory controller 2100 may access the memory device 2200. The memory controller 2100 may be implemented identically to the memory controller 200 described with reference to FIG. 1.

In an example, the memory controller 2100 may include components such as a Random Access Memory (RAM), a processing unit, a host interface, a memory interface, and an ECC circuit.

The memory controller 2100 may communicate with an external device through the connector 2300. The memory controller 2100 may communicate with the external device (e.g., the host) according to a specific communication protocol. In an example, the memory controller 2100 may communicate with the external device through at least one of various communication protocols such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe.

In an example, the memory device 2200 may be implemented with various nonvolatile memory devices such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Torque Transfer magnetic RAM (STT-MRAM).

In an example, the memory controller 2100 or the memory device 2200 may be packaged in a manner such as Package On Package (PoP), Ball Grid Arrays (BGAs), Chip Scale Packages (CSPs), Plastic Leaded Chip Carrier (PLCC), Plastic Dual In-line Package (PDIP), die in Waffle pack, die in wafer form, Chip On Board (COB), CERamic Dual In-line Package (CERDIP), plastic Metric Quad Flat Pack (MQFP), Thin Quad Flat Pack (TQFP), Small Outline Integrated Circuit (SOIC), Shrink Small Outline Package (SSOP), Thin Small Outline Package (TSOP), System In Package (SIP), Multi-Chip Package (MCP), Wafer-level Fabricated Package (WFP), or Wafer-level processed Stack Package (WSP), to be provided as a single semiconductor package. Alternatively, the memory device 2200 may include a plurality of nonvolatile memory chips, and the plurality of nonvolatile memory chips may be packaged based on the above-described packaging manners, to be provided as a single semiconductor package.

In an example, the memory controller 2100 and the memory device 2200 may be integrated as a single semiconductor device. In an example, the memory controller 2100 and the memory device 2200 may be integrated as a single semiconductor device, to constitute a Solid State Drive (SSD). The memory controller 2100 and the memory device 2200 may be integrated as a single semiconductor device, to constitute a memory card. For example, the memory controller 2100 and the memory device 2200 may be integrated as a single semiconductor device, to constitute a memory card such as a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

In an example, the memory device 2200 may be the memory device 100 described with reference to FIG. 1.

Figure 15:
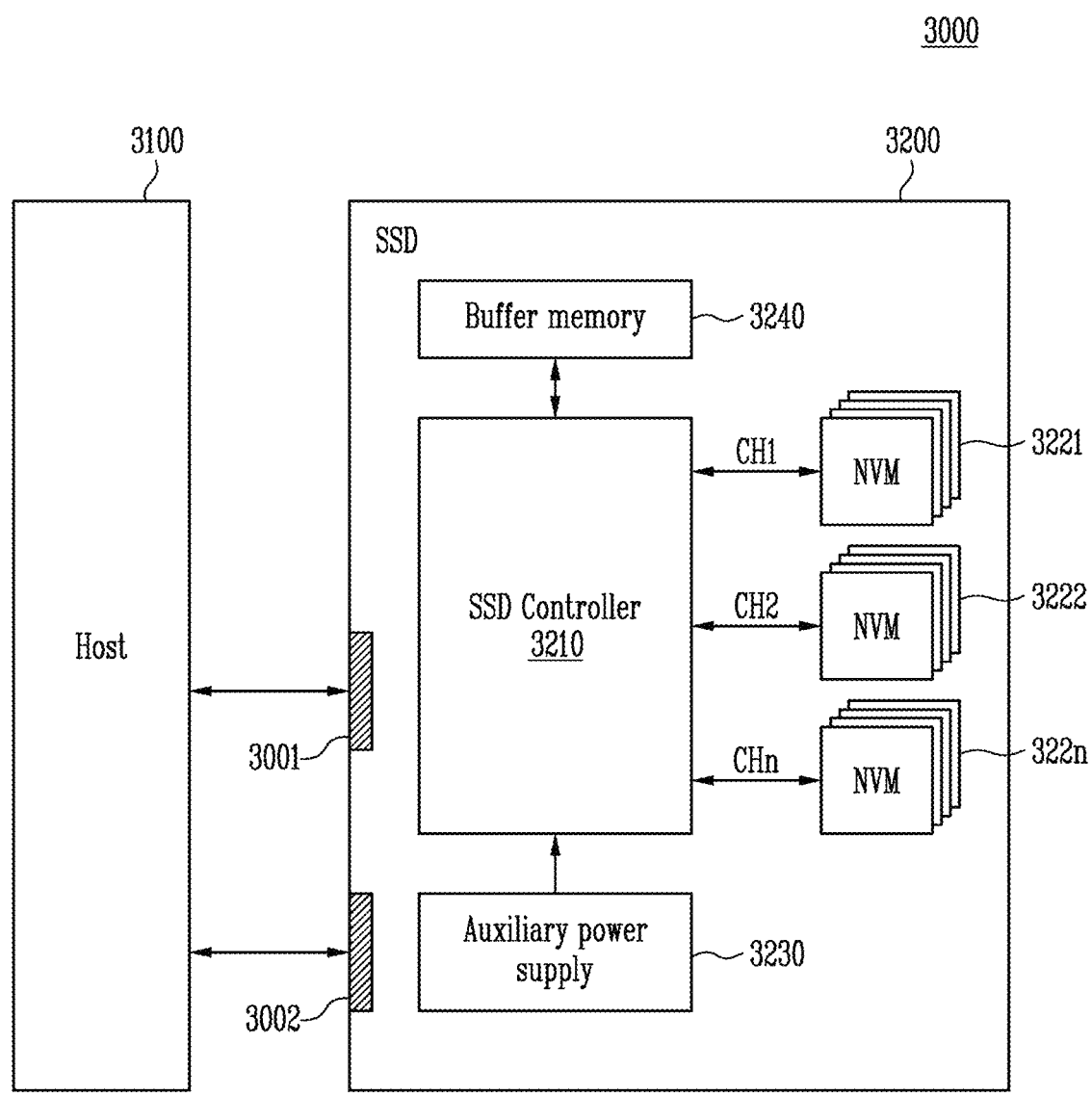
FIG. 15 is an example of a block diagram exemplarily illustrating a Solid State Drive (SSD) system to which the storage device including the memory device is applied in accordance with an embodiment of the disclosed technology.

FIG. 15 is a block diagram exemplarily illustrating a Solid State Drive (SSD) system to which the storage device including the memory device is applied in accordance with an embodiment of the disclosed technology.

Referring to FIG. 15, the SSD system 3000 includes a host 3100 and an SSD 3200. The SSD 3200 exchanges a signal SIG with the host 3100 through a signal connector 3001, and receives power PWR through a power connector 3002. The SSD 3200 includes an SSD controller 3210, a plurality of flash memories 3221 to 322n, an auxiliary power supply 3230, and a buffer memory 3240.

In an embodiment, the SSD controller 3210 may serve as the memory controller 200 described with reference to FIG. 1.

The SSD controller 3210 may control the plurality of flash memories 3221 to 322n in response to a signal SIG received from the host 3100. In an example, the signal SIG may be a signal based on an interface between the host 3100 and the SSD 3200. For example, the signal SIG may be a signal defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The auxiliary power supply 3230 is coupled to the host 3100 through the power connector 3002. When the supply of power from the host 3100 is not smooth, the auxiliary power supply 3230 may provide power of the SSD 3200. In an example, the auxiliary power supply 3230 may be located in the SSD 3200, or be located at the outside of the SSD 3200. For example, the auxiliary power supply 3230 may be located on a main board, and provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or temporarily store meta data (e.g., a mapping table) of the flash memories 3221 to 322n. The buffer memory 3240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

In an example, the flash memories 3221 to 322n may constitute the memory device 100 described with reference to FIG. 1.

Figure 16:
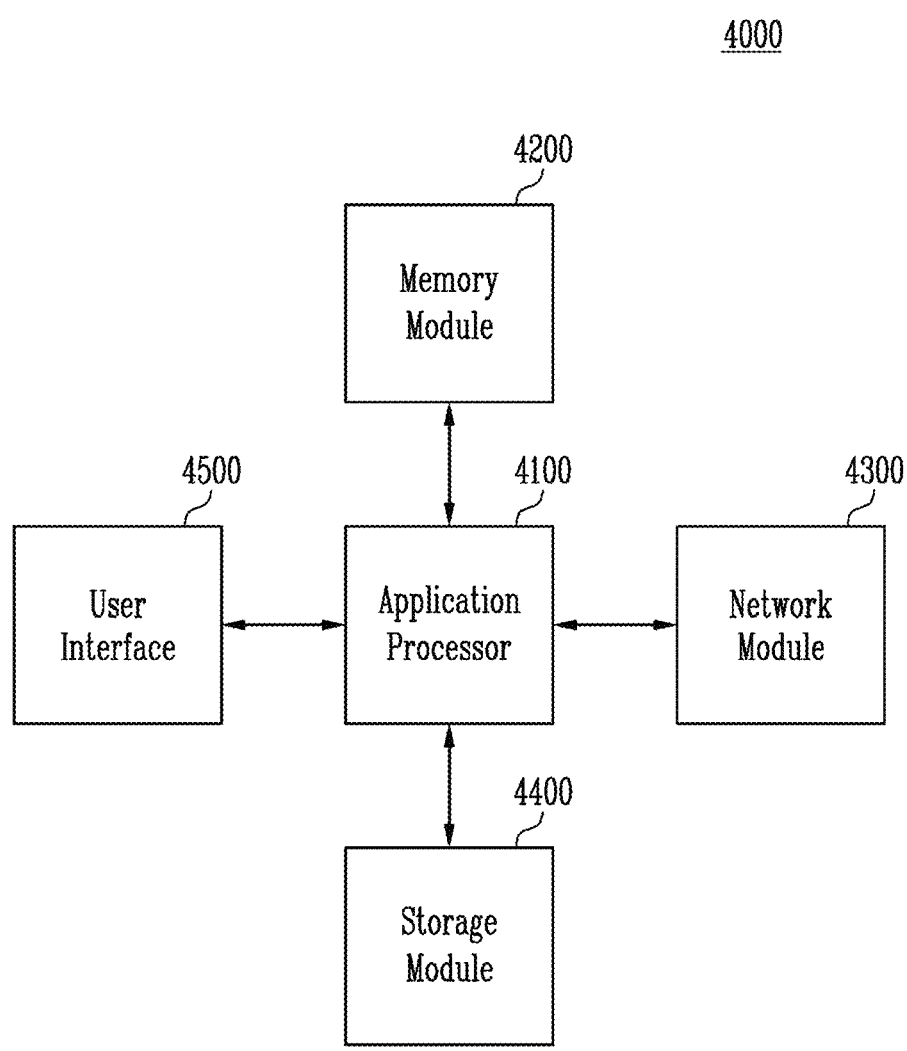
FIG. 16 is an example of a block diagram illustrating a user system to which the storage device including the memory device is applied in accordance with an embodiment of the disclosed technology.

FIG. 16 is a block diagram illustrating a user system to which the storage device including the memory device is applied in accordance with an embodiment of the disclosed technology.

Referring to FIG. 16, the user system 4000 includes an application processor 4100, a memory module 4200, a network module 4300, a storage module 4400, and a user interface 4500.

The application processor 4100 may drive components included in the user system 4000, an operating system (OS), a user program, or the like. In an example, the application processor 4100 may include controllers for controlling components included in the user system 4000, interfaces, a graphic engine, and the like. The application processor 4100 may be provided as a System-on-Chip (SoC).

The memory module 4200 may operate as a main memory, working memory, buffer memory or cache memory of the user system 4000. The memory module 4200 may include volatile random access memories such as a DRAM, an SDRAM, a DDR SDRAM, a DDR2 SDRM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. In an example, the application processor 4100 and the memory module 4200 may be provided as one semiconductor package by being packaged based on a Package on Package (PoP).

The network module 4300 may communicate with external devices. In an example, the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. In an example, the network module 4300 may be included in the application processor 4100.

The storage module 4400 may store data. For example, the storage module 4400 may store data received from the application processor 4100. Alternatively, the storage module 4400 may transmit data stored therein to the application processor 4100. In an example, the storage module 4400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. In an example, the storage module 4400 may be provided as a removable drive such as a memory card of the user system 4000 or an external drive.

In an example, the storage module 4400 may include a plurality of nonvolatile memory devices, and the plurality of nonvolatile memory devices may constitute the memory device 100 described with reference to FIG. 1.

The user interface 4500 may include interfaces for inputting data or commands to the application processor 4100 or outputting data to an external device. In an example, the user interface 4500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and a monitor.

In accordance with the disclosed technology, there can be provided a memory controller having improved performance and a storage device including the memory controller.

While the disclosed technology has been shown and described with reference to certain exemplary embodiments thereof, it will be understood by those skilled in the art that various changes in form and details may be made therein without departing from the spirit and scope of the disclosed technology as defined by the appended claims and their equivalents. Therefore, the scope of the disclosed technology should not be limited to the above-described exemplary embodiments but should be determined by not only the appended claims but also the equivalents thereof.

In the above-described embodiments, all steps may be selectively performed or part of the steps may be omitted. In each embodiment, the steps are not necessarily performed in accordance with the described order and may be rearranged. The embodiments disclosed in this specification and drawings are only examples to facilitate an understanding of the disclosed technology, and the disclosed technology is not limited thereto. That is, it should be apparent to those skilled in the art that various modifications can be made on the basis of the technological scope of the disclosed technology.

Meanwhile, the exemplary embodiments of the disclosed technology have been described in the drawings and specification. Although specific terminologies are used here, those are only to explain the embodiments of the disclosed technology. Therefore, the disclosed technology is not restricted to the above-described embodiments and many variations are possible within the spirit and scope of the disclosed technology. It should be apparent to those skilled in the art that various modifications can be made on the basis of the technological scope of the disclosed technology in addition to the embodiments disclosed herein.

What is claimed is:

1. A memory controller for controlling a memory device, the memory controller comprising:
   a first core configured to:
      receive a request with a first logical address from a host, and output, based on an abnormal power state being detected, first power loss protection (PLP) information indicating whether a logical address processing operation to convert the first logical address into a second logical address is completed; and
   a second core configured to, in response to the first PLP information indicating that the logical address processing operation is incomplete, perform the logical address processing operation.

2. The memory controller of claim 1, wherein the first core includes:
   a logical address processor configured to perform the logical address processing operation to convert the first logical address into the second logical address with a size different from a size of the first logical address; and
   a first core queue configured to store the request and the second logical address.

3. The memory controller of claim 1, wherein the first core includes:
   a first core queue configured to store a plurality of requests and corresponding first logical addresses received from the host; and
   a duplicated request checker configured to perform a duplicated request check operation to process at least one of requests corresponding to a same first logical address from among the corresponding first logical addresses as an invalid request.

4. The memory controller of claim 3, wherein the duplicated request checker is configured to perform the duplicated request check operation to process a request with an earlier reception time from among the requests corresponding to the same first logical address, as the invalid request.

5. The memory controller of claim 3, wherein the first core includes a detector configured to detect the abnormal power state, and output abnormal power state information in response to detecting the abnormal power state.

6. The memory controller of claim 1, wherein the first core is configured to output second PLP information indicating whether a duplicated request check operation is completed, and
wherein the second core is configured to, in response to the second PLP information indicating that the duplicated request check operation is incomplete, perform the duplicated request check operation.

7. The memory controller of claim 6, wherein the first core is configured to perform the logical address processing operation or the duplicated request check operation.

8. The memory controller of claim 6, wherein the first core further includes a first PLP manager configured to output the first PLP information or the second PLP information to the second core.

9. The memory controller of claim 1, wherein the second core is configured to,
in response to abnormal power state information being received from the first core, cancel an operation of the memory device, and
perform another operation to store mapping information representing a conversion relationship between a physical address of the memory device and the second logical address in the memory device.

10. The memory controller of claim 9, wherein the second core includes an address converter configured to convert the second logical address into the physical address based on the mapping information.

11. The memory controller of claim 1, wherein both the first core and the second core are configured to be operable to perform the logical address processing operation, and
wherein the second core is operable to perform and complete the logical address processing operation when the logical address processing operation is not completed by the first core.

12. A memory controller for controlling a memory device, the memory controller comprising:
a first core configured to, in response to an abnormal power state being detected, perform a first operation or a second operation, and output power loss protection (PLP) information indicating whether each of the first operation and the second operation is completed; and
a second core configured to identify an incomplete operation among the first operation and the second operation based on the PLP information, and perform the incomplete operation.

13. The memory controller of claim 12, wherein, the first core includes a duplicated request checker configured to perform the first operation to process at least one of requests with a same address among a plurality of requests received from a host, based on a reception time of each of the requests, as the invalid request.

14. The memory controller of claim 13, wherein the second core is configured to, in response to the abnormal power state being detected, cancel an operation of the memory device.

15. The memory controller of claim 14, wherein the first core is configured to perform the second operation to convert a first logical address with a request received from the host into a second logical address with a size different from a size of the first logical address.

16. A storage device comprising:
a memory device; and
a memory controller including:
a first core configured to receive requests with first logical addresses from a host;
a second core configured to obtain a physical address corresponding to a selected first logical address of the first logical addresses, and control the memory device to perform an operation corresponding to a selected request of the requests in a storage area of the memory device represented by the physical address; and
a buffer memory configured to store data to be stored in or read from the memory device,
wherein the first core is configured to, in response to a detection of an abnormal power state, output abnormal power state information, perform a first power loss protection (PLP) operation, and output PLP information indicating whether a second PLP operation is completed, and
wherein the second core is configured to, in response to the abnormal power state information being received, control the memory device to cancel the operation, and determine whether to perform the second PLP operation according to the PLP information.

17. The storage device of claim 16, wherein the second PLP operation is an operation to remove at least one of duplicative requests with a same first logical address among from the requests.

18. The storage device of claim 16, wherein the second PLP operation is an operation to convert the first logical addresses into second logical addresses, respectively.

19. The storage device of claim 18, wherein the buffer memory is configured to store meta data representing a conversion relationship between physical addresses of the memory device and second logical addresses.

20. The storage device of claim 16, wherein the second core is configured to, in response to the PLP information indicating that the second PLP operation is incomplete, perform the logical address processing operation, and perform the second PLP operation.

* * * * *